United States Patent
Sun et al.

(10) Patent No.: US 9,906,111 B2
(45) Date of Patent: Feb. 27, 2018

(54) FINE ELEMENT MAGNET ARRAY

(71) Applicants: Xiuhong Sun, Windham, NH (US); Andrew Sun, Windham, NH (US)

(72) Inventors: Xiuhong Sun, Windham, NH (US); Andrew Sun, Windham, NH (US)

( * ) Notice: Subject to any disclaimer, the term of this patent is extended or adjusted under 35 U.S.C. 154(b) by 307 days.

(21) Appl. No.: 14/831,322

(22) Filed: Aug. 20, 2015

(65) Prior Publication Data

US 2016/0111948 A1    Apr. 21, 2016

Related U.S. Application Data

(60) Provisional application No. 62/066,629, filed on Oct. 21, 2014.

(51) Int. Cl.
| | |
|---|---|
| H02K 3/04 | (2006.01) |
| H02K 41/03 | (2006.01) |
| H01F 7/02 | (2006.01) |
| H02K 1/17 | (2006.01) |

(52) U.S. Cl.
CPC ......... *H02K 41/031* (2013.01); *H01F 7/0278* (2013.01); *H02K 3/04* (2013.01); *H02K 1/17* (2013.01)

(58) Field of Classification Search
CPC .......... H02K 41/031; H02K 3/04; H02K 1/17; H01F 7/0278
USPC ............................................ 310/12.21, 156.6
See application file for complete search history.

(56) References Cited

U.S. PATENT DOCUMENTS

| | | | | |
|---|---|---|---|---|
| 4,536,230 | A * | 8/1985 | Landa ..................... | H01F 7/021 148/300 |
| 6,841,910 | B2 * | 1/2005 | Gery .................... | H02K 49/106 310/103 |
| 7,965,010 | B2 * | 6/2011 | Froeschle ............ | H02K 41/031 310/12.25 |
| 8,384,251 | B2 * | 2/2013 | Shikayama .......... | H02K 41/031 310/12.02 |
| 8,514,047 | B2 | 8/2013 | Sankar | |

(Continued)

OTHER PUBLICATIONS

"Design of Permanent Multipole Magnets with Oriented Rare Earth Cobalt Materials", Nuclear Instruments and Methods, vol. 169, No. 1, pp. I-I0, 1980.

*Primary Examiner* — Forrest M Phillips
(74) *Attorney, Agent, or Firm* — Walter F. Dawson; Pearson & Pearson, LLP

(57) ABSTRACT

A set of symmetrically segmented square prism Permanent Magnet (PM) halves in a 45-45-90 triangular prism and a rectangular square prism with predefined 45° stepped magnetizations are designed as Fine Elements (FEs), bringing finely adaptive mosaicking advantages for array arrangement. Optimized Halbach effect FE PM pole modules in cuboidal and isosceles trapezoidal prism shapes are invented to provide an augmented one-side-operating field. Simulation data show that typical dual layer FE PM arrays generate high-fidelity sinusoidal waveforms within air-gaps with peak field strengths of up to 1.2 Tesla. Featuring a pole width-to-thickness ratio ranging from 1 to 6, FE PM motor tracks with a series of scale, format, and sectional features are constructed in lightweight ferrous and/or nonferrous structures, which energize OEM and/or FE current carrying winding coils to implement linear and curvilinear motors with high power/force/torque density and low force ripple.

21 Claims, 14 Drawing Sheets

(56) References Cited

U.S. PATENT DOCUMENTS

| | | | |
|---|---|---|---|
| 8,803,467 B2 | 8/2014 | Sun | |
| 8,995,703 B2* | 3/2015 | Ilkorur | H04R 3/02 |
| | | | 381/396 |
| 9,157,416 B2* | 10/2015 | Bang | F03D 9/002 |
| 9,287,029 B1* | 3/2016 | Colich | H01F 7/0289 |
| 9,302,577 B2* | 4/2016 | Catalan | B60K 7/00 |
| 9,318,942 B2* | 4/2016 | Sugita | H02K 41/031 |
| 2005/0225192 A1* | 10/2005 | Kloepzig | H02K 1/2753 |
| | | | 310/156.43 |
| 2010/0052437 A1* | 3/2010 | Froeschle | H02K 41/031 |
| | | | 310/12.25 |
| 2012/0262019 A1* | 10/2012 | Smith | H02K 1/2766 |
| | | | 310/156.07 |
| 2014/0084731 A1* | 3/2014 | Iwami | H02K 1/278 |
| | | | 310/156.07 |
| 2015/0357870 A1* | 12/2015 | Hazeyama | H02K 1/2766 |
| | | | 310/156.07 |
| 2017/0098972 A1* | 4/2017 | Vann | H01F 7/0273 |

\* cited by examiner

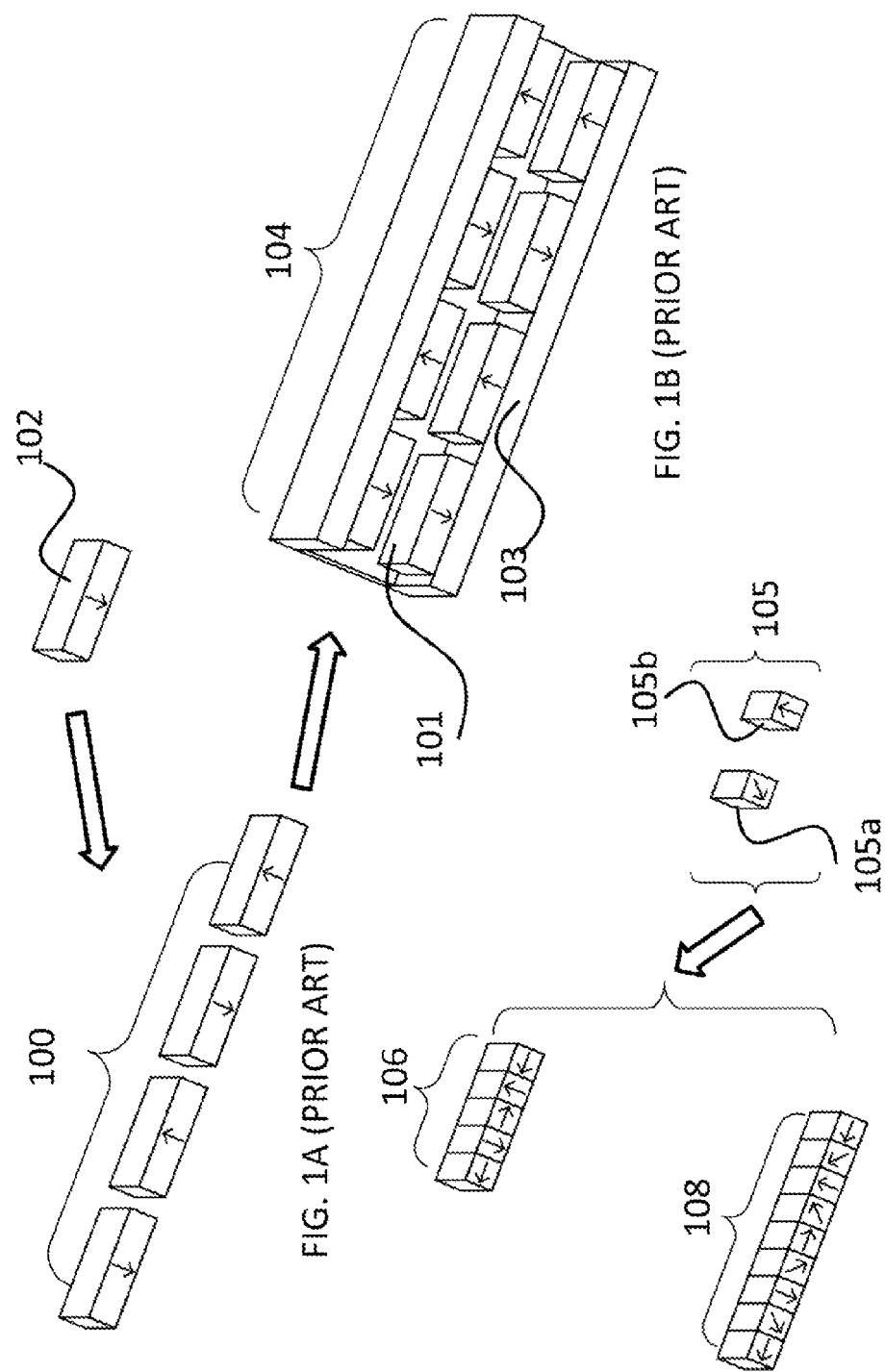

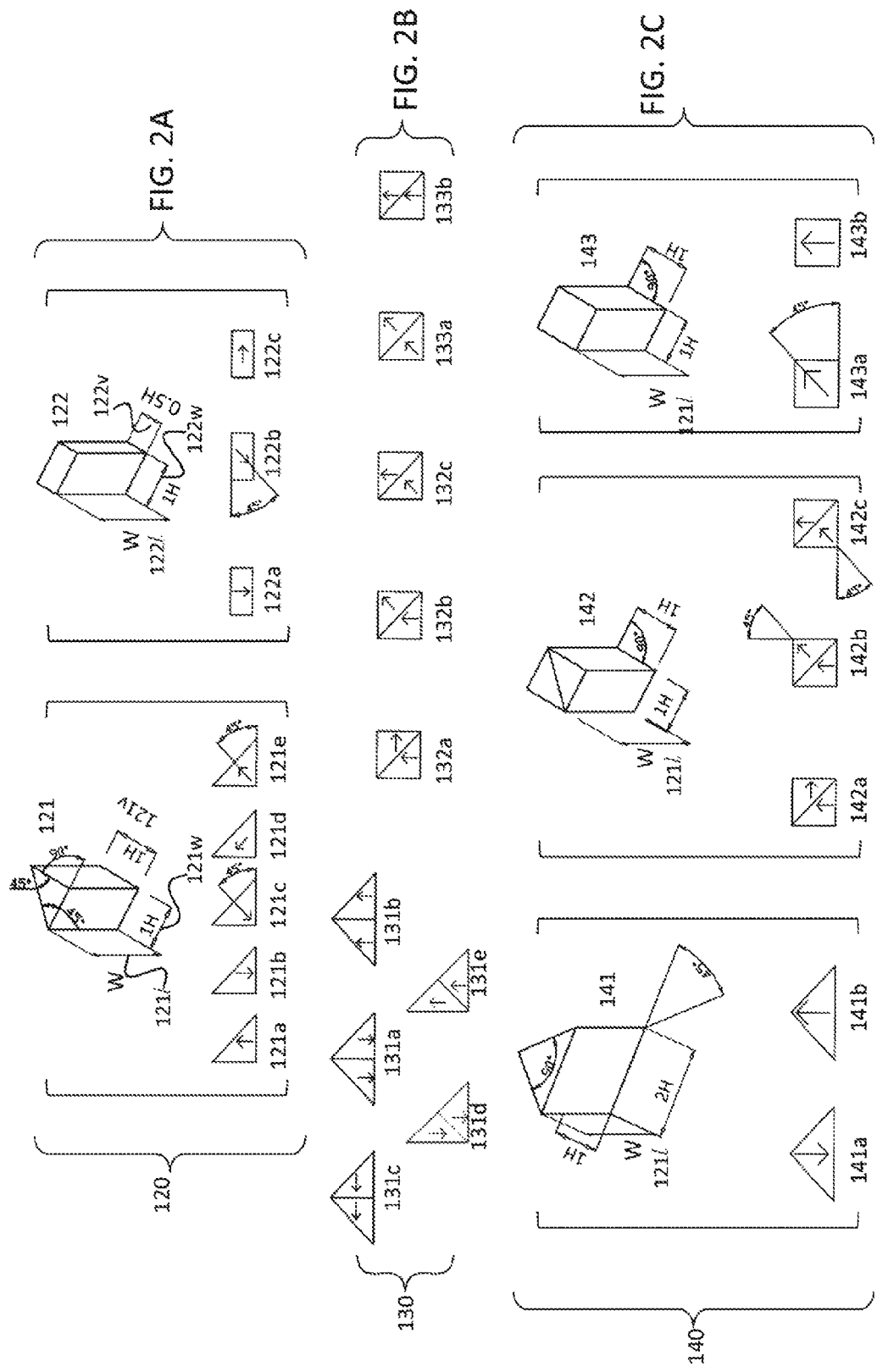

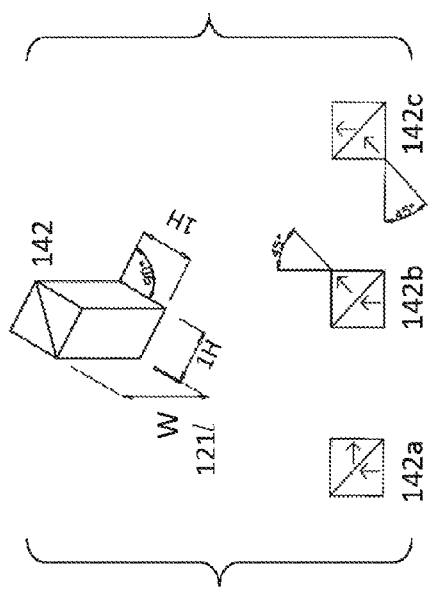
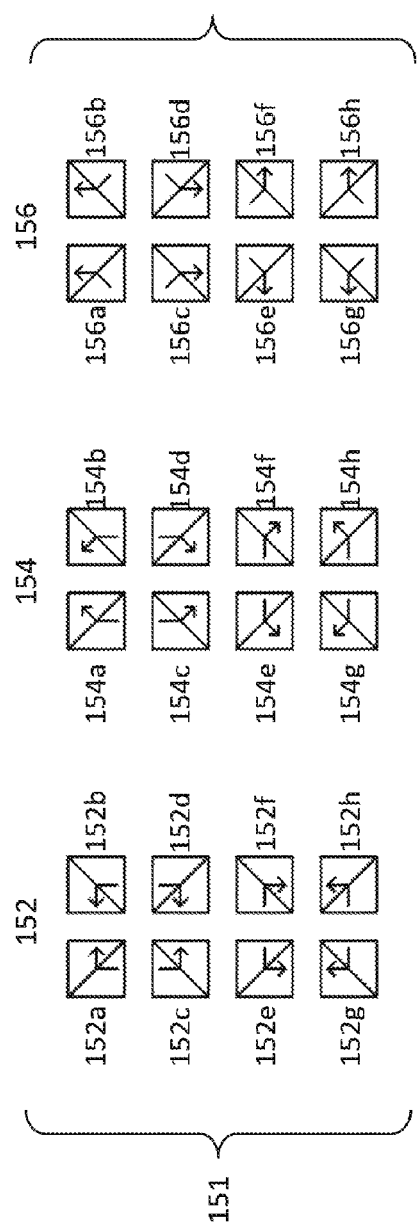
FIG. 3A
FIG. 3B
FIG. 3C

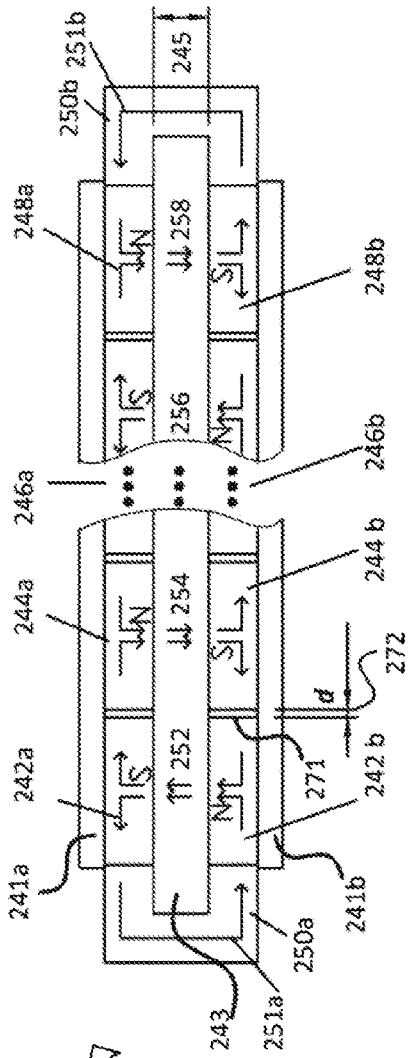
FIG. 4C
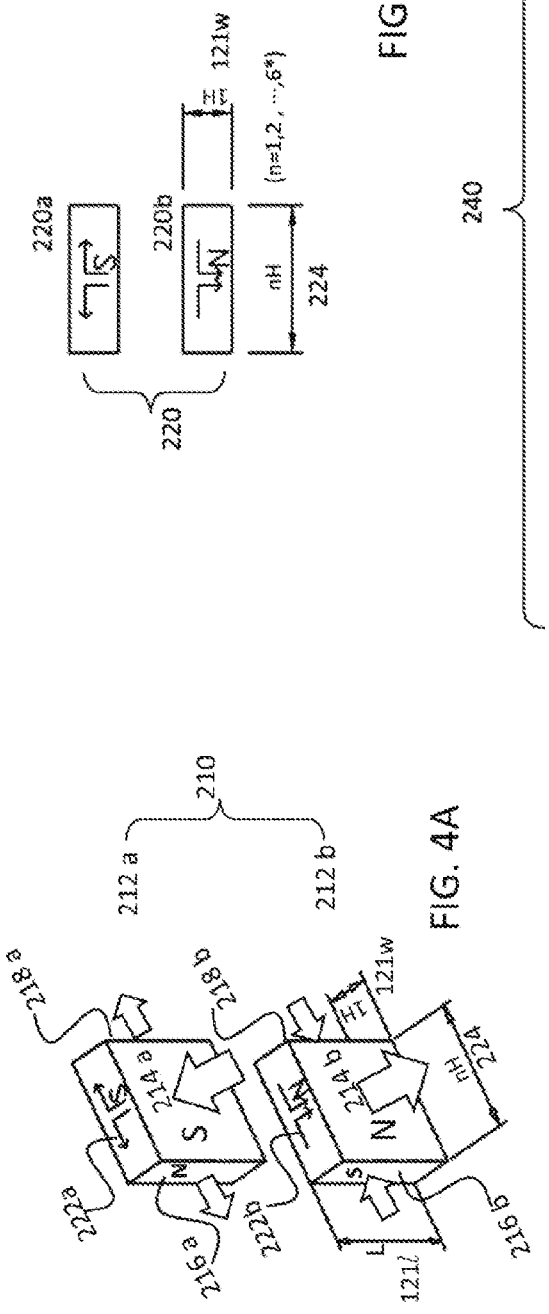
FIG. 4D
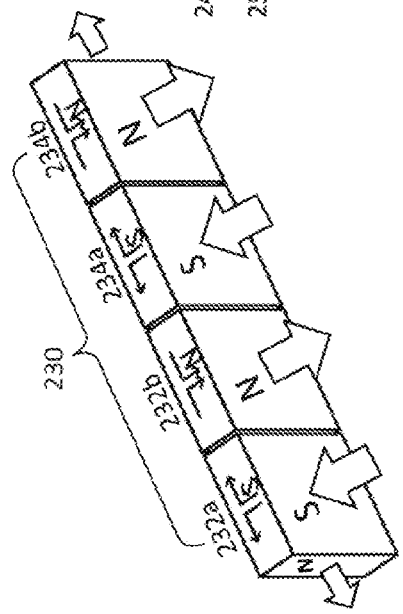
FIG. 4A
FIG. 4B

| Ref# | FE Patterns of MAG(TP) (N) | Type | Pole Width (H) | Average Airgap Field \|B\| (Tesla) | | | Peak AirGap Field \|B\| (Tesla) | | | AirGapWave/Sinusoid Area Ratio (%) | | | Notes* |
|---|---|---|---|---|---|---|---|---|---|---|---|---|---|
| | | | | Base | Iron Back | Iron Filler | Base | Iron Back | Iron Filler | Base | Iron Back | Iron Filler | |
| 382b | | V | 1 | 0.361 | 0.362 | 0.344 | 0.551 | 0.559 | 0.537 | 99.62 | 98.46 | 97.58 | S |
| 302b | | I | 2 | 0.553 | 0.556 | 0.580 | 0.917 | 0.920 | 0.931 | 92.97 | 93.11 | 96.07 | E |
| 342b | | III | 2 | 0.511 | 0.496 | 0.512 | 0.754 | 0.734 | 0.742 | 104.4 | 104.2 | 106.4 | E |
| 384b | | V | 2 | 0.582 | 0.592 | 0.592 | 0.932 | 0.941 | 0.948 | 96.23 | 97.01 | 96.21 | S, H, A |
| 322b | | II | 3 | 0.639 | 0.664 | 0.683 | 1.008 | 1.041 | 1.049 | 98.3 | 98.86 | 101 | S, H, A |
| 304b | | I | 4 | 0.634 | 0.679 | 0.695 | 1.045 | 1.127 | 1.130 | 94.44 | 93.72 | 95.72 | H, A |
| 324b | | II | 4 | 0.602 | 0.676 | 0.697 | 1.011 | 1.106 | 1.111 | 92.57 | 95.03 | 97.57 | S, A |
| 344b | | III | 4 | 0.610 | 0.670 | 0.685 | 0.927 | 1.001 | 1.007 | 102.4 | 104.4 | 105.9 | S, E |
| 362b | | IV | 4 | 0.609 | 0.689 | 0.705 | 1.070 | 1.182 | 1.187 | 88.59 | 90.69 | 92.43 | H, A, M |
| 326b | | II | 5 | 0.568 | 0.677 | 0.691 | 0.995 | 1.133 | 1.136 | 88.98 | 93.13 | 94.92 | A |
| 346b | | III | 5 | 0.558 | 0.666 | 0.685 | 0.897 | 1.027 | 1.027 | 96.47 | 101.0 | 102.7 | S, E |
| 366b | | IV | 5 | 0.546 | 0.670 | 0.684 | 1.056 | 1.212 | 1.218 | 80.55 | 86.12 | 87.54 | H, M |

* A=High in average field strength; E = Very easy to make; H=High in peak field strength; M = moderate extra effort is needed to assemble the module that may increase cost; S = Best sine wave fitting for airgap field.

FIG. 7

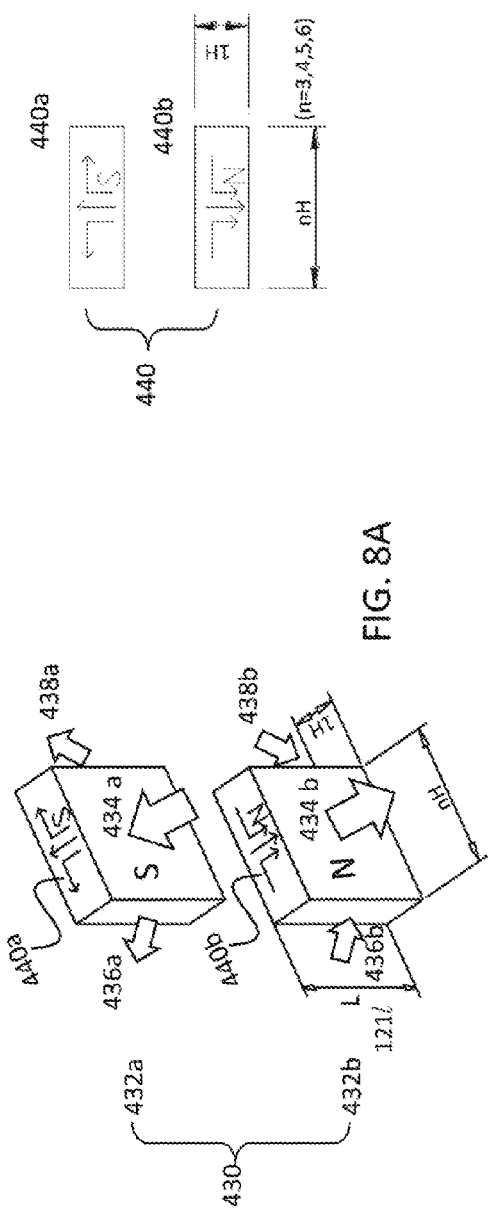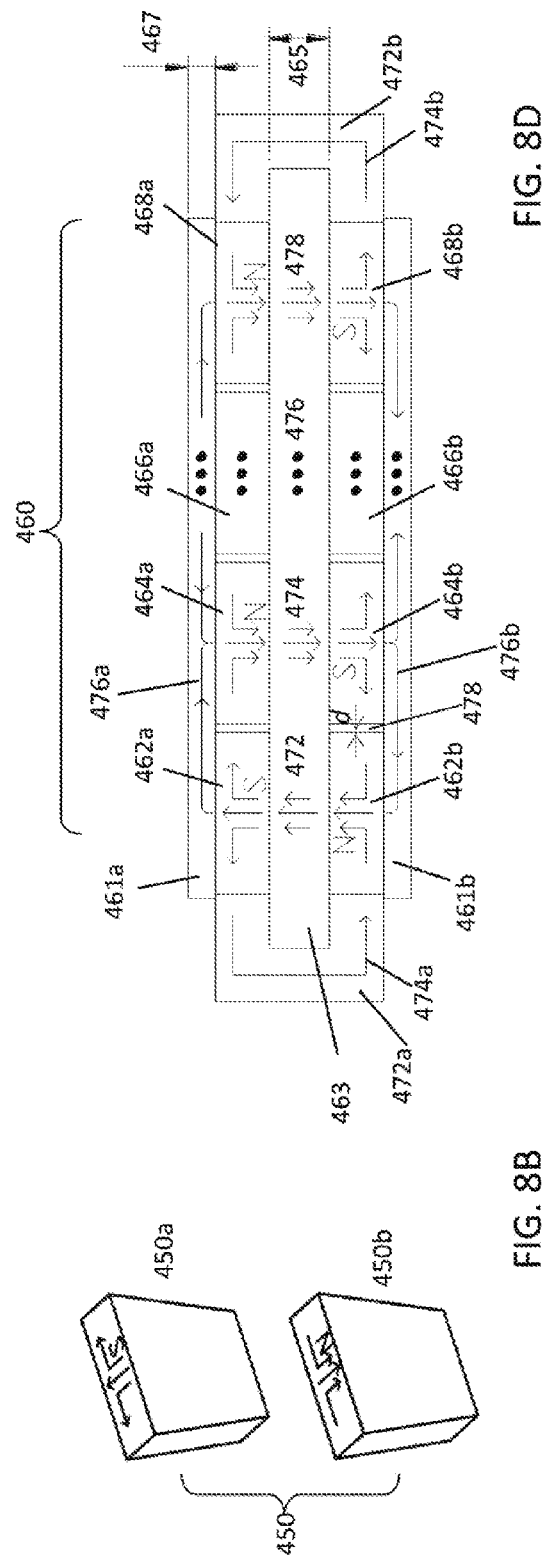

| Item # | MAGYP North Pole FE patterns | Type | Unit Width (W) | Average AirGap \|B\| (Tesla) | | Peak AirGap \|B\| (Tesla) | | AirGapWave/SineWave Area Ratio (%) | | notes* |
|---|---|---|---|---|---|---|---|---|---|---|
| | | | | 1/8" Fe Back | 0.05" filler | 1/8" Fe Back | 0.05" filler | 1/8" Fe Back | 0.05" filler | |
| 502b | | I | 3 | 0.724 | 0.726 | 1.088 | 1.09 | 103.3 | 103.3 | S, H, A, C |
| 504b | | I | 4 | 0.719 | 0.728 | 1.121 | 1.124 | 99.77 | 100.7 | S, C |
| 522b | | IIIa | 4 | 0.768 | 0.776 | 1.161 | 1.166 | 116.1 | 116.6 | T, H, A |
| 512b | | II | 4 | 0.736 | 0.751 | 1.126 | 1.143 | 112.6 | 114.4 | T, E, G |
| 524b | | IIIb | 4 | 0.711 | 0.716 | 1.014 | 1.095 | 109.2 | 109.5 | T, E, G |
| 514b | | II | 5 | 0.731 | 0.746 | 1.055 | 1.062 | 108.1 | 109.6 | T, E, G |
| 532b | | IV | 5 | 0.737 | 0.753 | 1.108 | 1.117 | 103.7 | 105.0 | S, H, A, M |
| 516b | | II | 6 | 0.704 | 0.721 | 1.054 | 1.069 | 104.3 | 106.9 | T, A, E |
| 534b | | IV | 6 | 0.698 | 0.718 | 1.092 | 1.104 | 99.78 | 101.5 | S, H, M |
| 102 | | ** | 4 | 0.754 (with 1/4" thick iron back, U channel) | | 0.929(with 1/4" thick iron back, U channel) | | 126.4 | | T, E, C |

* A=High in average field strength; C = Concise magnet pattern; E = Relative easy to assemble the module; G = smooth in waveform rising and falling; H=High in peak field strength; M =moderate extra effort is needed to assemble the module. S = Sinusoidal shaped waveform for the airgap field; T = Trapezoidal shaped waveform for the airgap field.

FIG. 11

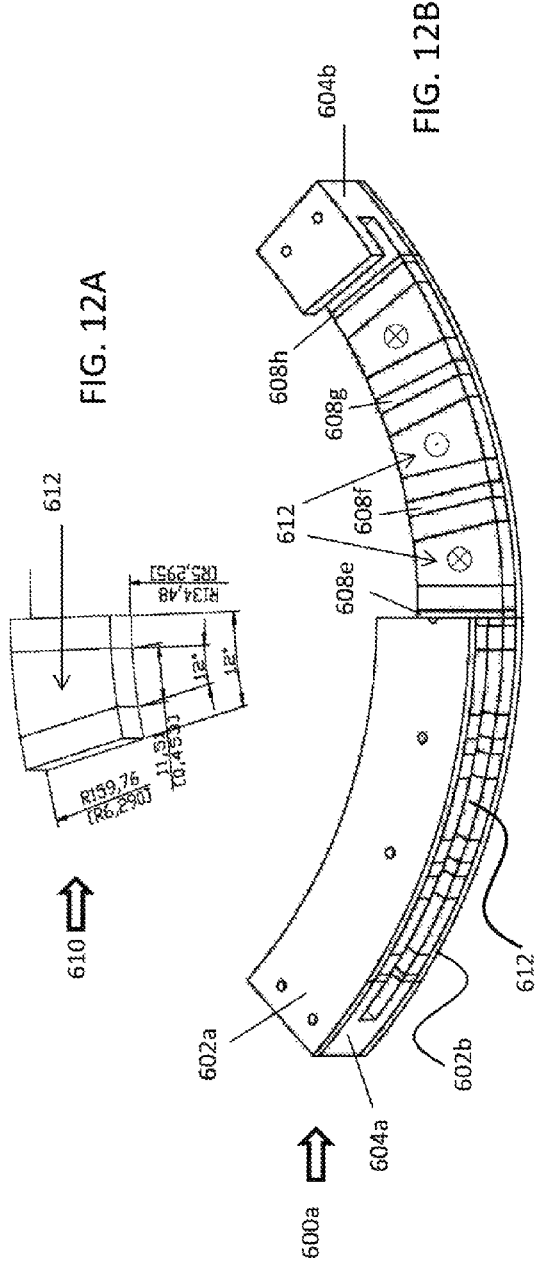
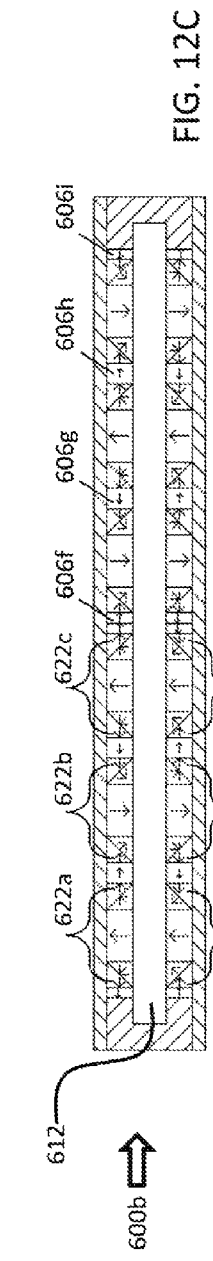
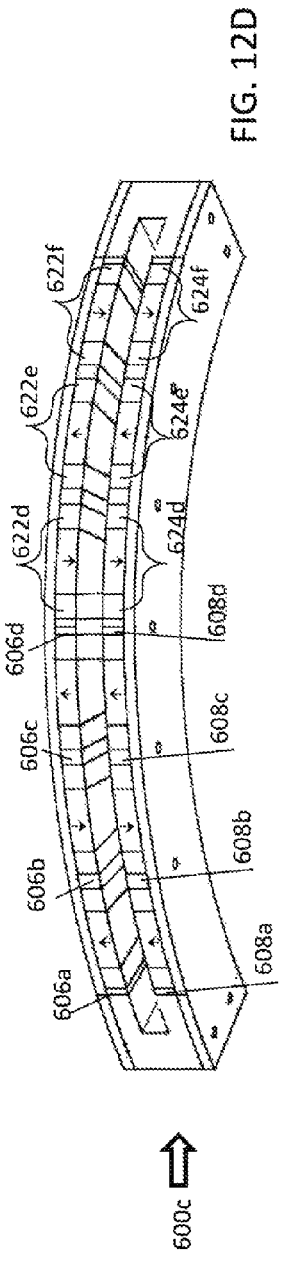
FIG. 12A
FIG. 12B
FIG. 12C
FIG. 12D

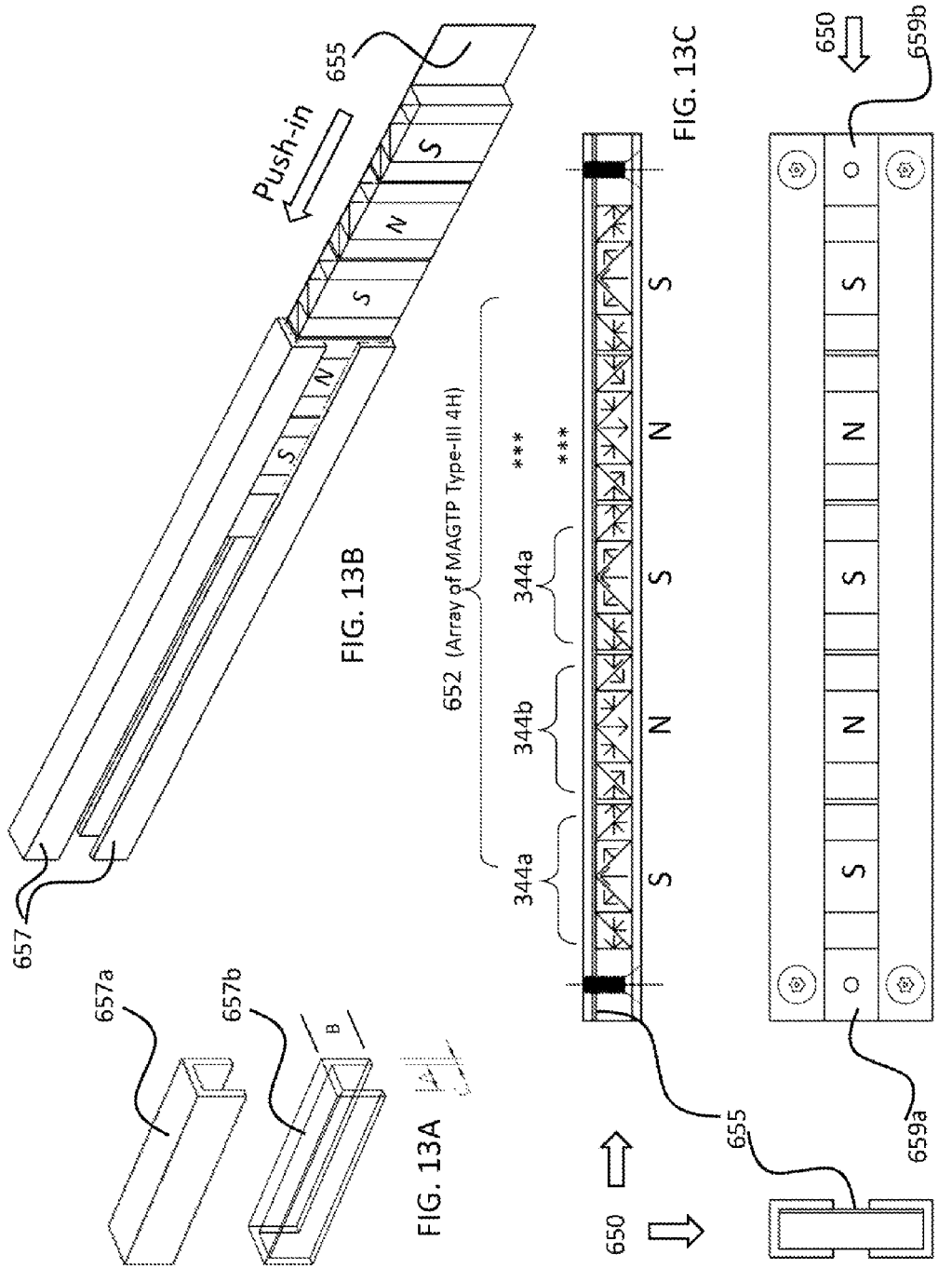

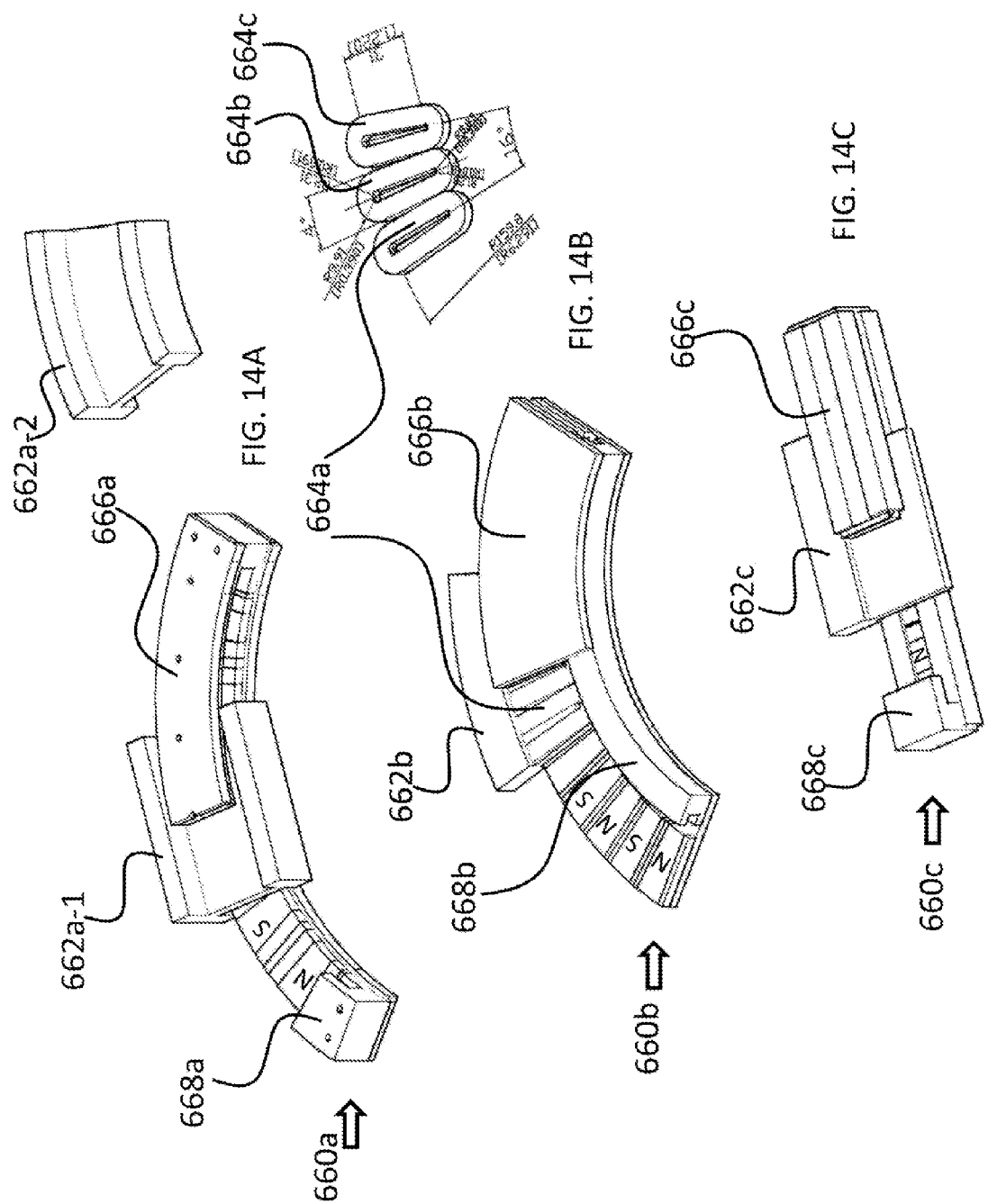

FINE ELEMENT MAGNET ARRAY

CROSS-REFERENCE TO RELATED APPLICATION

This application claims the benefit of Provisional Application No. 62/066,629, filed Oct. 21, 2014, which is incorporated herein by reference.

FIELD OF THE INVENTION

Embodiments of this invention generally relate to 1) permanent magnet (PM) array configurations, and more particularly, the optimized array configurations using finely segmented magnet elements arranged with fine magnetization patterns which are advances of Halbach type arrays; 2) modularized Fine Element (FE) PM array assemblies, particularly a series of easily configurable various sized FE PM pole modules that are arranged into arrays to construct a series of linear and curvilinear motor magnetic tracks; and 3) the FE PM array based linear and curvilinear electric machines or motor systems, particularly those lightweight systems used in the aerospace, robotics, medical and hi-tech applications, including but not limited to the gimbaled equipment for aerial imaging, photogrammetry, metrology, and remote sensing applications, where the force/torque/power performance, finely and dynamically controlled actuations need to be non-compromised and the size, weight, and power consumption (SWaP) need to be minimized.

DESCRIPTION OF RELATED ART

Various PM arrays and their configurations have been studied, reported and patented over the past few decades. The progress of these PM array technologies allows today's leading edge linear and curvilinear electromotive machines and motion controlled systems to be designed with increasingly high power, and torque/force performance.

FIGS. 1A-1C illustrate schematic views of the typical prior art PM arrays and their building elements. FIG. 1A illustrates a conventional rectangular block alternating pole PM array 100 that is integrated into a linear U-channel york 104 (FIG. 1B) consisting of a pair of parallel soft ferromagnetic plates in accordance with prior art. Each of the two plates (103a, 103b) of said york holds a plurality of magnets arranged adjacent to each other in alternating North-South pole orientations to construct a linear periodic magnetic field. Architecturally, this Dual Layer (DL) PM array embodiment is arranged only with a plurality of a single PM part—a cuboid magnet element 102 with one simple magnetization through its thickness. This gives an architectural simplicity that makes this type of PM array easy to make and easily scalable. In addition, this type of PM array device (york 104) can be easily constructed as sectional devices. Sections can be annexed to extend array length. This regular type PM array has been widely adapted into linear and curvilinear motion systems, such as described by U.S. Pat. No. 8,803,467, issued Aug. 12, 2014 to Xiuhong Sun and U.S. Pat. No. 8,384,251, issued Feb. 26, 2013 to Shikayama et al.

The major issues of regular DL PM array 104 are that 1) it requires heavy and thick iron backs to construct a U-shaped york to have its otherwise scattered magnetic field redirected into the air-gap 101 of the U-channel; 2) its magnetic field distribution is in general a trapezoidal shape rather than the ideal sinusoidal shape; and consequently, 3) it induces high order harmonics in its air-gap magnetic field spectrum with extra force ripple for degradation of its actuation consistency. Accordingly, these arrays could not satisfy certain advanced applications such as aerospace and hi-tech robotics, in which fast, high dynamic and short settling time for precise positioning are needed; and high force, torque, and power to weight/volume ratios are critical to the system design.

Other prior art PM arrays exist, including the U.S. Patent Application No. US20120262019, by inventors James Smith et al, which discloses flux focusing arrangement for permanent magnets. The Flux focusing is claimed to be achieving by optionally arranging two splitter magnets and one or two pusher magnets around a center magnet. Ferromagnetic material called lens, is used to assist focusing too. Lacking quantitative analysis, along with many optional arbitrary shapes and magnetizations without optimization, the focusing design is at most questionable qualitative ideal. The published drawings look complicated, high cost to make, and size, weight, and performance compromised.

Another type of PM array that features a one sided flux effect without a need of ferromagnetic backs is the Halbach type. The effect of this type of array was discovered by John C. Mallinson in 1973, and such an array itself was independently invented by the physicist Klaus Halbach of Livermore national laboratory in California ("Design of Permanent Multipole Magnets with Oriented Rare Earth Cobalt Materials", Nuclear Instruments and Methods, Vol. 169, No. 1, pp. 1-10, 1980). A Halbach array is a special arrangement of magnets that augments the magnetic field on one side of the array while cancelling the field to near zero on the other side. In the 1980's, the Halbach array was successfully used in particle accelerators and free electron lasers as wiggler magnets for modern physics research.

FIG. 1C illustrates a schematic view of two typical configurations of Halbach PM arrays 106 and 108 in accordance with prior art. Their magnetization patterns are essentially a 90-degree (for 106) and a 45-degree (for 108) step pole rotational arrangements, in which a plurality of a square prism shaped magnet element 105 with two magnetizations 105a and 105b are arranged by rotating their pointers indicated inside the front face of the square prism 105.

In recent years, there are continued interests for the further development of Halbach type arrays for hi-tech linear/curvilinear motor applications. Taking advantages of magnetic field self-concentrating in the front of one side of Halbach array along with its near sinusoidal waveform, it is promising to implementing a lightweight linear/curvilinear motor without the "thick and heavy" iron back for high performance actuation.

Several recent patents are related arts for Halbach characteristic arrays and their extensions. U.S. Pat. No. 7,965,010 issued Jun. 21, 2011 to Froeschle et al. discloses a Liner Motor with Patterned Magnet Arrays. An armature for a linear motor and its magnetic structures related to the extension of Halbach concept are described. U.S. Pat. No. 8,514,047 issued Aug. 20, 2013 to Pat Sankar discloses a set of Magnetic Arrays with increased Magnet Flux. The embodiments of the invention general relate to a novel magnet arrangement to further enhance the performance of the array. Pat Sankar claims that his arrangement of magnets with five configurations can result in significantly much higher percentage gain in magnet flux with respect to the largest magnetic flux of a component magnet, as compared to Halbach array configurations.

However, by far, Halbach PM arrays have not been widely adopted in industry, and particularly, the linear/curvilinear servomotor industry. Prior art Halbach array problems are 1)

they are not geometrically flexible, such as lack of adequate options on magnet pitch/thickness ratios and non-adaptive for providing various pole shapes particularly when using only a single square prism 105; 2) they lack the modularity and sectionality characterized by many conventional block magnet array products; and 3) they are difficult to be assembled and retained especially when using today's strong rare earth magnets such as NdFeB (Neodymium-Iron-Boron) and SmCo (Samarium-Cobalt) material PMs. This is simply because the strong dispatch energy within the non-equilibrium magnet elements will collapse array if the glue or retaining of the array fails. Accordingly, it is the inspiration of this invention to develop structurally refined and modularized Halbach type Fine Element (FE) magnet arrays by designing 1) a flexibly configurable elementary FE PM set and arranging them with optimized patters to improve the size and shape versatility and adaptability of various FE PM arrays and their size series; 2) easy to use FE PM array pole modules for array modularity; 3) practical array retaining mechanisms with improved retaining stress in equilibrium for FE PM arrays; and 4) practical FE PM motor systems with leading-edge power/torque/force densities.

This present invention is a significant step forward from the prior arts in extending PM array arrangement patterns and improving the types, scale ratios, and sizes of Halbach type arrays with performance enhancement. This FE magnet array invention results in a unique series of Halbach effect FE PM arrays that are more scalable and practical to make and more versatile, adaptable, and operational for various industrial applications.

SUMMARY OF THE INVENTION

The embodiments of the present invention are a series of FE permanent magnet (PM) arrays that consist of finely segmented and standardized magnet elements with specially arranged magnetization patterns for one-sided-flux operating. These FE PM arrays are designed with modular and sectional considerations. They feature a wide range of magnetic pitch options from 1 to 6 times array thickness, finely-tuned waveforms for high-fidelity sinusoid or optional various quasi-sinusoidal/trapezoidal shapes, and improved peak and average air-gap magnetic field strengths. Typical FE PM array products are including but not limited to the practical, high performance lightweight magnetic tracks that are compatible to commercial off the shelf (COTS) motor coil forcers.

In accordance with one embodiment of the present invention, an FE magnet is conceptualized and defined as a basic PM array building element that consists of a symmetrically segmented square prism magnet half that is magnetized with predefined pole orientations. A standard FE magnet has 2 geometric shapes, the 45-45-90 triangular prism and a rectangular square prism half, with 8 total combined-shape-magnetization options which allow significantly fine and flexible magnet patterns for configuration of high performance PM arrays.

In accordance with another embodiment of the present invention, to make FE magnet configuration fine and concise with fewer segments or parts, a frequently used n-number of adjacent FE magnet combination is defined as n-FE-composite, $FE_n$. A series of preferred $FE_n$s, either with angled or uniform magnetizations, are introduced as a part of FE PM array building components, which allow FE PM array products to be more economically, more practically, or more easily manufactured for prototyping or mass-production.

In accordance with another embodiment of the present invention, a set of square prism shaped $FE_2$s with angled magnetization patterns are defined as Magnet Assemblies Grouped with Angled Polarities (MAGAPs). The first MAGAP consists of two FE magnets with a 90° angled polarity rotation is called MAGAP-90. Two other MAGAPs feature a 45° angled polarity changes. One is with its polarity angled from an edge side to a corner and is called MAGAP-45EC. The other is with its polarity angled from a corner to an edge and is called MAGAP-45CE. MAGAPs are frequently used $FE_2$ building blocks, which allow FE PM arrays to be configured with increased pattern or width/thickness options, improved implementation simplicity, and smoother field distribution.

In accordance with another embodiment of the present invention, a Magnet Assembly Grouped with T-shaped Polarity (MAGTP) is conceptualized, defined, and developed as an innovative, black box type pole module. A plurality of MAGTP South/North pole modules can be periodically paired to form a sectional, alternating pole MAGTP array that are easily aligned as these modules magnetically attract each other on their sides. As a Halbach effect device, the MAGTP array produces one-sided active field with minimal stray field on its back. High-strength lightweight alloy, carbon fiber, polycarbonate materials or thin structured carbon/ferritic stainless steels are optional materials for the array backs.

In accordance with another embodiment of the present invention, 5 types of MAGTPs with 12 pairs of preferred MAGTP FE pole arrangement patterns are disclosed in detail. First, two pairs of preferred Type-I MAGTP modules are configured. These two modules simply improve the regular 90 degree rotation 4-step Halbach array and the 45 degree rotation 8-step Halbach array into modular and sectional devices. Second, taking advantage of MAGAPs, three pairs of preferred Type-II MAGTP modules are configured with improved waveform smoothness, along with two new width options beyond those that Type-I can provide. Particularly, Type-II 3H and 4H options are outstanding with high fidelity sinusoidal waveforms. Third, by arranging 21-1 width special 45-45-90 triangular prism $FE_2$ magnets as center piece, three pairs of preferred Type-III MAGTP modules are characterized. Type III compensates the Type-I and Type-II shortages in making wide width modules and results in an outstanding 5H width Type-III MAGTP array with high fidelity sinusoidal waveform. In addition, Type-III modules are the easiest to be assembled among 5 Types. Fourth, two pairs of preferred Type-IV MAGTP modules are characterized by arranging the 2H width 45-45-90 triangular prism $FE_2$ magnets with an opposite polarity orientation to that of Type-III's. Their advantages are the strongest peak and average field strengths among all five types. For practical manufacturing cost and other balance concerns, only 4H and 5H width Type-IV MAGTPs are selected as preferred options. Finally, two pairs of preferred Type-V MAGTP are characterized with the narrowest pole width, giving a unique 1H width MAGTP and an outstanding, high fidelity sinusoidal waveform 2H width Type-V MAGTP.

Using computer simulation with a finite-element method freeware software package, Finite Element Method Magnetics (FEMM) version 4.2, the performance of the selective FE PM arrays are illustrated, including the magnetic field line patterns and the air-gap field waveforms of 4 preferred sinusoidal MAGTP Arrays and the quantitative performance summaries of all 12 preferred FE patterned MAGTPs. It shows with the field line patterns that MAGTP modules have an excellent "one sided flux" property with almost all magnetic field flux confined inside their air-gaps and near zero stray fields outside the array devices. With the waveform plots, four preferred MAGTPs are shown with high fidelity sinusoids with peak field strengths ≥1 Tesla. Finally, the test results show the "Average Airgap Field |B| (Tesla)", "Peak AirGap Field |B| (Tesla)", and "AirGapWave/Sinusoid Area Ratio (%)" specifications of 12 preferred MAGTPs tested with different material fixtures. It proves that FE architecture provides sinusoidal flux, high peak field strength, one-sided flux approximation, and extended scalability with various typed and sized MAGTPs.

In accordance with another embodiment of the present invention, a Magnet Assembly Grouped with Y-characteristic Polarity (MAGYP) is conceptualized and designed. MAGYP is configured by arranging an array of FE magnets with appropriate pole orientation patterns to constructively build up magnetic field on the active side of the array and destructively reduce field on the back side in certain degree. Ferro-backs are generally needed for MAGYP to deal with the unconfined magnetic field on the array back which is generally less than ½ of the self-confined field in the front. Accordingly, a thin layer of ferro-back, such as ½ to ⅓ thick to that of a regular U-channel PM array, is sufficient for MAGYPs. This results in another pole module with one side enhanced flux featuring lightweight, compact size, and high performance. In addition, with the aid of ferro-back, MAGYP allows not only cuboidal but also trapezoidal prism shaped modules. A plurality of MAGYP modules can be aligned to form linear, circular or curvilinear shaped FE PM arrays for linear, rotary, or curvilinear motor applications. Using dedicated MAGYP symbolic notations, a drawing for a DL alternating pole MAGYP array is illustrated to provide a periodic magnetic field for coreless linear and curvilinear motor applications.

In accordance with another embodiment of the present invention, 4 types of MAGYPs with 9 pairs of preferred pole arrangement patterns are disclosed. In general, Type-I MAGYP is a modification of Type-I MAGTP by removing the array-tangential magnets with the ferro-back aid, giving a higher average strength and high quality sinusoidal waveform for its 3H and 4H width models. Type II MAGTP features a wider center piece magnet that doubles that of the corresponding Type I's and uses MAGAPs as edge pieces. It has a strong average field with a waveform shaped between sinusoidal and trapezoidal. Type III is Type I extension and differs to Type-I in using a wider format center magnet piece, giving a wider waveform option between sinusoidal and trapezoidal shapes. Type-IV MAGYP is evolved from Type-IV MAGTP, with improved average strength and great sinusoidal waveform results for 5H and, especially the outstanding, 6H width modules. With ferro-back benefits, the magnetization weighing or balancing between array-normal and array tangential magnets is less critical, and the shape and size of the center magnet pieces become more flexible. All the cuboidal shaped center pieces of MAGYPs can be replaced by appropriate isosceles trapezoidal prisms for constructing curvilinear array devices.

The magnetic flux density waveforms and line patterns of two MAGYP arrays and a regular PM array are illustrated and compared. The array elements for three type arrays are two preferred 4H width MAGYP modules and a square magnet respectively. It has been shown by the magnetic line patterns that the DL MAGYP array retaining with thin ferro-backs can effectively have all its magnetic field flux confined in their air-gap regions with near zero stray fields outside the array devices. Furthermore, the "Average Airgap Field |B| (Tesla)", "Peak AirGap Field |B| (Tesla)", and "AirGapWave/Sinusoid Area Ratio (%)" are specified for 9 preferred MAGYPs. It has been shown that the preferred MAGYPs are excellent, typically featuring a waveform shaped between sinusoidal and that of the conventional array. They also feature significantly higher average field strengths than those of MAGTPs. The average of the average field strengths of 9 MAGYPs is 0.737 Tesla that is 17% higher than the corresponding average of 0.629 Tesla for 12 MAGTPs. The peak field strength of these 9 MAGYPs are all above 1.0 Tesla with average peak field strength at 1.11 Tesla, which is impressively higher than that of the conventional U-shaped iron back PM array.

In certain embodiments, lightweight structured fixtures for linear and arc shaped FE PM tracks are parts of innovation for the FE array devices. A DL arc shaped magnet track device consisting of MAGYP modules is disclosed for curvilinear servomotor applications. In comparison with a conventional PM array track in a U-shaped york format, it has a 9.1% improvement in peak magnetic field strength, a 12% improvement in waveform factor, along with significantly lower weight and better compactness resulting from using a 50% thinner ferritic stainless steel plate. Furthermore, for an FE PM track, especially when it has a short arc length, the DL separation can be provided by two end pieces at two arc ends to replace the bigger and heavier DL retaining piece at the arc bottom and hence reducing further the weight and the structural complexity of the PM track.

In accordance with another embodiment of the present invention, U-Shaped push-on-trim-channels that are made of aluminum, polycarbonate, carbon fiber, and non-magnetic stainless steel are adapted to simply FE PM array retaining. Various number of FE alternating pole modules separated by inter module spacers are inserted into a pair of said U-shaped structural channels on to the periodic retaining positions. And a very thin, such as a 0.018 inch, ferritic stainless steel sheet is used as an additional back layer. This implements a simple, durable, and low cost MAGTP/MAGYP array retaining system for the FE PM tracks.

Using various retaining mechanism described above, a set of operational linear/curvilinear motor systems, consisting of a linear/curvilinear FE PM track in the format of DL MAGTP/MAGYP array as a motor stator and a linear/curvilinear motor forcer unit in the format of COTS or custom-made ironless winding coil, are illustrated, showing that the FE PM array architecture allows a simple structure/format linear/curvilinear motor or actuation systems with none or significantly reduced use of ferromagnetic materials. The typical performance advantages of the FE PM motor/actuation system include high power and force/torque densities, high acceleration and short settling time, low force ripple, high accuracy, and excellent modular extendibility, coupled with low acoustic noise and low Cost, Size, Weight, and Power (C-SWaP).

Additional objects, features and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

FIG. 1A shows an arrangement of a prior art rectangular block Permeant Magnet (PM) array.

FIG. 1B illustrates a prior art Dual Layer (DL) PM track configured in a U-shaped york.

FIG. 1C shows the arrangements of two prior art Halbach PM arrays.

FIG. 2A illustrates an embodiment of a set of PM Fine Elements (FEs).

FIG. 2B illustrates an embodiment of a set of 2-FE-composites ($FE_2$s).

FIG. 2C illustrates an embodiment of the implementations of three sets of $FE_2$s.

FIG. 3A illustrates three Magnet Assemblies Grouped with Angled Polarities (MAGAPs).

FIG. 3B shows MAGAP symbolic notations.

FIG. 3C illustrate the orientation patterns of three sets of MAGAPs.

FIG. 4A illustrates the black box presentations of a pair of South and North pole modules of the Magnet Assembly Grouped with T-shaped Polarity (MAGTP).

FIG. 4B illustrates an embodiment of an alternating pole linear MAGTP array.

FIG. 4C illustrates a pair of MAGTP symbolic notations in planar schematic views.

FIG. 4D illustrates an embodiment of a DL alternating pole linear MAGTP array.

FIG. 7 is the performance data sheet of 12 pairs of preferred FE MAGTPs.

FIG. 8A illustrates the black box presentations of a pair of South and North pole modules of the cuboid shaped Magnet Assembly Grouped with Y-characteristic Polarity (MAGYP).

FIG. 8B illustrates the perspective drawings of a pair of isosceles trapezoid prism shaped MAGYP South and North pole modules.

FIG. 8C illustrates a pair of MAGYP symbolic notations in planar schematic views.

FIG. 8D illustrates an embodiment of a DL alternating pole MAGYP array.

FIG. 11 is the performance data sheet of 9 pairs of preferred FE MAGTPs.

FIG. 12A shows dimensions of a FE MAGYP module.

FIG. 12B is a 3D sectional view of a curvilinear motor DL PM track using FE MAGYP array.

FIG. 12C shows front-face magnetization pattern of the curvilinear motor DL PM track.

FIG. 12D is another 3D illustration of the embodiment of the curvilinear motor DL PM track.

FIG. 13A shows alloy and polycarbonate mechanical retaining components for FE PM array.

FIG. 13B shows how to assemble FE PM pole modules into a pair of push-on-trim-channels.

FIG. 13C is a front-face view of the magnetization pattern of an FE PM array retained within the U-Shaped push-on-trim-channels.

FIG. 13D is a multi-view of an FE PM array retained in U-Shaped push-on-trim-channels.

FIG. 14A illustrates an embodiment of a lightweight arc motor consisting of a DL FE MAGTP array, and a preferred linear/curvilinear winding coil.

FIG. 14B illustrates an embodiment of another lightweight arc motor consisting of a DL FE MAGYP array and an innovative Fine Geometry (FG) curvilinear winding coil.

FIG. 14C illustrates an embodiment of a slim lightweight linear motor consisting of a pair of push-on-trim-channel retained DL FE MAGTP array and a linear winding coil.

DETAILED DESCRIPTION OF THE INVENTION

Figure 5:
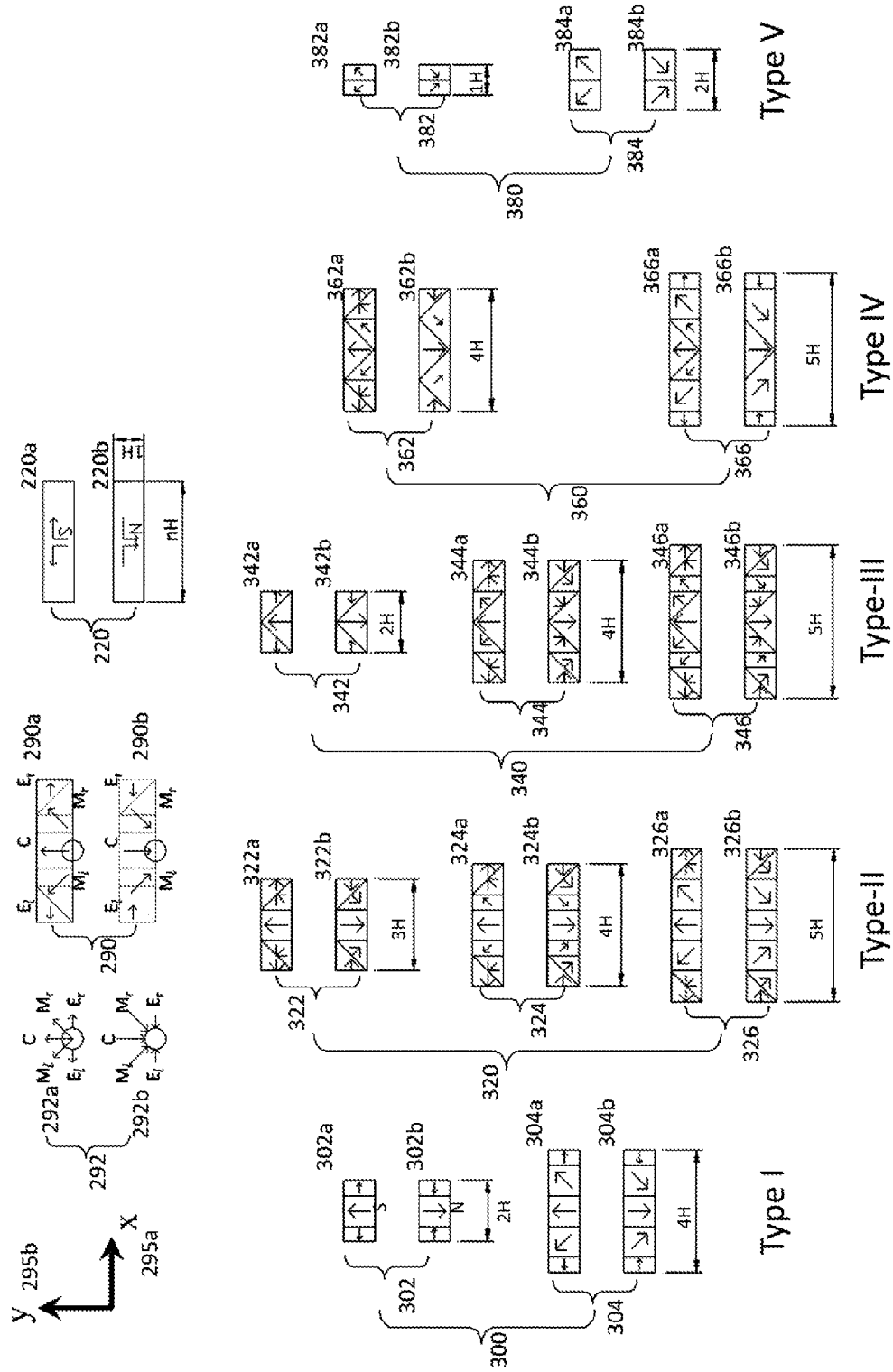
FIG. 5 illustrates FE magnetization arrangement patterns of 12 pairs of preferred MAGTP South and North modules in 5 types.

The embodiments of this invention use Fine Element (FE) magnets as array building blocks. In comparison with the prior art regular Halbach array that uses a square prism shaped magnet 105 as a building block to arrange PM array pole orientations resulting in few coarsely patterned magnetizations, FIG. 2A illustrates a special set of FEs of PM that adopted as elementary array building blocks. These FEs are shaped as the symmetrically segmented square prism PM halves with predefined 45° step magnetization orientations. The complete set of FEs 120 have only two shapes, a 45-45-90 triangular prism segment 121 and a rectangular half 122 of the square prism. Being magnetized with 45 degree step rotated magnetization angles from an edge reference, these two shaped FEs comprise up to 8 independent pole orientations, 121a-e, 122a-c, allowing significantly fine and flexible magnet patterns for configuration of innovative PM arrays.

With the embodiments illustrated by 121 in FIG. 2A, the geometry of the first set of FEs, the triangular prism shaped FEs, is defined. The front face of the 45-45-90 triangular prism consists of an isosceles right triangle. The leg length, 121w (or 121v), is defined as Unit Thickness (1H) of FE; the prism height, 121l, is defined as W. The H and W of the FE are generally the thickness and width of the resultant FE PM array respectively. A special example of 1H is ¼ inches; a special example of W=4H=1 inch.

With the embodiments illustrated by 122 in FIG. 2A, the geometry of the other set of FEs in a rectangular square prism half is defined. One edge length 122v of the rectangular prism front face is ½H, while the other edge length 122w is 1H. The height 122l of the special rectangular prism is the same as W of the 45-45-90 triangle prism. The 45-45-90 triangular and the special rectangular FE prisms have the same volume and use the same amount of magnet materials (1 Unit Mass or 1 U).

The 45-45-90 triangle prism FE 121 is magnetized with 5 different orientations as shown in 5 arrowed FE front face patterns 121a-e. Among them, 121a and 121b show a pair of FE magnetizations that are parallel to their vertical legs within the front faces but with opposite directions. 121c and 121e show two other 45-45-90 triangle prism FE magnetizations that are normal to their prism front face hypotenuses with their magnetization vectors pointing to their S (South pole) and N (North pole) hypotenuse sides respectively. The FE 121d is magnetized along its hypotenuse.

The rectangular prism FE 122 is magnetized with 3 different orientations as shown by 122a, 122b, and 122c. The first magnetization 122a of the rectangular prism is directed parallel to the shorter edge of the front face. The second magnetization vector 122b of the rectangular prism is 45 degrees rotated from one of its front face edges. The third magnetization 122c is directed along the longer edge of the front face of the rectangular prism.

In certain embodiments, the FE PM arrays can be configured and implemented more concisely by introducing multi-FE-composites or n-FE-composites ($FE_n$s; n=2, 3, 4, ...) that is a group of adjacent FEs adapted as an extended array building block. An $FE_n$ with its dedicated magnetization pattern can be physically implemented as assembled or glued or as a directly magnetized single piece magnet. FIG. 2B illustrates 10 pieces of 2-FE-composites ($FE_2$s) 130; each is arranged by two of 45-45-90 triangle prism FEs 121*a-e*. When the magnetization pattern of an $FE_2$ is angled, it can be made as an assembled unit. When an $FE_2$ has a constant oriented magnetization, it can be made and presented as an $FE_2$-shaped, equivalently-magnetized, uniform piece of a magnet, because the resultant field of the $FE_2$-shaped magnet is essentially the same as that of the corresponding assembled $FE_2$.

The embodiments illustrated by FIG. 2C are example implementations of three groups of $FE_2$s. The first group of $FE_2$s is shaped in a 2 U 45-45-90 prism 141 with their magnetizations presented by 141*a* and 141*b*, which concisely implement their equivalent $FE_2$s patterned by 131*a* and 131*b* respectively. Similarly, the $2^{nd}$ group of $FE_2$s 143*a* and 143*b*, which are square prism shaped with 0 and 45° constant magnetizations to its one edge, are the implementations of their equivalent $FE_2$s patterned by 133*a* and 133*b* respectively. $FE_2$s 141*a* and 141*b* are obtainable as Built To Order (BTO) single piece magnet from a magnet factory. And $FE_2$s 143*a* and 143*b* are available either as COTS magnets, especially for a standard sized piece, such as 1H=0.25 inches, or a BTO component.

The embodiments illustrated by 142*a-c* in FIG. 2C are the third group of $FE_2$s patterned the same as 132*a-c*. These are square prism shaped with special angled magnetization patterns. Accordingly, this group of $FE_2$s 142*a*, 142*b*, and 142*c* are named Magnet Assembly Grouped with Angled Polarities (MAGAP). MAGAPs are very useful for FE PM array optimization. The first MAGAP 142*a* is called MAGAP-90, which consists of two FE magnets 121*a* and 121*b* with a 90° angled polarity rotation. Another MAGAP 142*b* features a 45° angled polarity change on the hypotenuse border of two 45-45-90 triangle FEs 121*a* and 121*c*. Considering its magnet polarity vector starts from the S-Pole side of FE 121*a*, turns 45° on the hypotenuse border of the two adjacent FEs, and then ends at the corner of FE 121*c* as the drawing shown, this assembly 142*b* is named MAGAP-45EC. The other MAGAP 142*c* consists of FE 121*e* and 121*b*. The magnet polarity vector of 142*c* starts from the corner of 121*e*, turns 45° on the hypotenuse border of the two triangle FEs, then point towards the North pole surface of 121*b*. Accordingly, 142*c* is named MAGAP-45CE. Three MAGAPs have manageable attracting forces between FE components at their common hypotenuse borders. COTS Loctite® 331™ Structural Adhesive can be used to assemble MAGAP-90 (142*a*), MAGAP-45EC (142*b*), and MAGAP-45CE (142*c*).

MAGAPs are special FE array building blocks that are primarily arranged as the edge and interface parts of an FE module. FIG. 3A shows the embodiment of a set of MAGAPs. And FIG. 3B illustrates their corresponding symbolic notations respectively. As the edge parts and interfaces between FE modules, MAGAPs are generally oriented and mirrored with more arrangement patterns than those of inner parts. Accordingly MAGAP symbolic notations are introduced to illustrate their pattern orientations and interfaces concisely. FIG. 3C shows all possible rotated and mirrored MAGAP using notations 150*a*, 150*b* and 150*c* for MAGAP-90 (142*a*), MAGAP-45EC (142*b*) and MAGAP-45CE (142*e*) respectively. It shows that 1) there are only 8 possible rotational pattern arrangements 152*a-h* for the 90° pole bending MAGAP-90 and a plurality of MAGAP-90 150*a* can be mirrored and/or rotated to implement all these arrangements 152; 2) there are 16 possible rotational arrangements 154*a-h*, 156*a-h* for a pair of 45° pole bending MAGAP-45EC (150*b*) and MAGAP-45CE (150*c*), and a plurality of a pairs of 150*b*, 150*c* can be mirrored and/or rotated to provide all 16 patterned rotational arrangements 154 and 156. It concludes that only a plurality of three MAGAPs 142*a*, 142*b*, and 142*c* are needed to be made to provide all needed pattern/interfacing orientations of MAGAPs, allowing FE PM arrays to be configured concisely with a simplicity.

In accordance with certain objectives of this disclosure, the FE PM array devices need to be designed as modularized for easy to use and simple array extension. The FE advantages for the finely adaptive array mosaicking provide the feasibility for various array arrangement modularizations. A preferred Magnet Assembly Grouped with T-shaped Polarity (MAGTP) is conceptualized, defined, and developed to implement a Halbach effect pole module. FIGS. 4A-4D illustrates embodiments of MAGTP with its schematic view, symbolic notation, and its example array configurations.

In certain embodiments illustrated by the perspective drawings in FIG. 4A, a pair of solid cuboid shaped MAGTP modules 212*a*, 212*b* are conceptualized as a pair 210 of three pole magnetic black boxes. Active magnet flux is generated in the fronts of the main South and North pole faces 214*a* and 214*b* of the black boxes. The linkage poles, 216*a*-218*a* or 216*b*-218*b*, are formed on two side faces adjacent to the main South/North pole faces of MAGTP cuboids, which are designed to be linked with other linkage poles of MAGTPs or terminated with ferromagnetic end pieces. Since MAGTP is Halbach array characterized, in an ideal case, the flux leakage through the other faces of the cuboids are negligible. A pair of symbolic, 90°-angled arrow sets 222*a* and 222*b* are drawn on the top faces of the MAGTPs to explicate the functions of the modules and their pole distributions.

Geometrically, a MAGTP module consists of a set of arranged array building blocks, such as FEs and/or $FE_n$s. Accordingly, the thickness of a MAGTP module is 1 Unit Thickness (1H) 121*w* of FE. The width 224 of a MAGTP is n Unit Thickness of FE (where n=1, 2, . . . , 5). The height of a MAGTP model is the same as the FE height L, 121*l*.

FIG. 4B illustrates an example of sectional extendable, alternating pole MAGTP array 230 that is aligned with two periods of MAGTP South/North Pole pairs 232*a*, 232*b* and 234*a*, 234*b* that exhibit one sided periodic magnetic field denoted by the flux vector arrow signs. The linkage poles between adjacent MAGTP modules 232*a*, 232*b* and 234*a*, 234*b* magnetically attract each other, giving a benefit of easy module alignment. The MAGTP array 230 produces a Halbach-type, one-sided active field with minimal stray field on its back. The linkage poles at two ends of the MAGTP sectional array 230 are designed to be linked either with the linkage poles of other sectional MAGTP array(s) or terminated by ferromagnetic end piece to complete a magnet circuit at the end of the array. The termination improves active field strength while reducing array end field leakage.

FIG. 4C shows a pair of symbolic notations 220 in a planar schematic drawing style for a pair of MAGTP black boxes. The symbolic 90 degree angled arrow set 222*a* and 222*b* explicates that the active fields of the MAGTP modules are beneath the South and North poles of the black boxes 220*a* and 220*b* as shown and that the linkage pole orientations are as the arrow indicated.

FIG. 4D illustrates a general configuration of a dual layer (DL) alternating pole MAGTP array device 240 to provide a periodic magnetic field typically for coreless linear motor applications. The DL MAGTP device consists of upper and lower layers of MAGTP arrays (242a, 244a, ..., 248a) and (242b, 244b, ..., 248b) each of which consists of a plurality of alternating MAGTP South and North modules that exhibit alternating flux distribution in the fronts of the active faces of the array. The dual MAGTP layers are arranged with their active sides facing each other and the S-poles of a layer facing the N-poles of the other layer to have their resultant active alternating fields 252, 254, ..., 258 constructively superimposed. The arrangement forms an air-gap 243 between DLs with a width 245 that confines the active field of the DL array device.

In FIG. 4D, a pair of structural array backs 241a and 241b together with a pair of structural end pieces 250a and 250b are adapted to retain MAGTP modules. Generally the end pieces are made by soft ferromagnetic material to terminate the linkage ports at two ends of the array. The ferromagnetic end pieces 250a and 250b provide the needed magnet circuits 251a and 251b that enhance the magnetic fields 252 and 258 at the edge pole air-gap areas, making the air-gap field strengths in the edge pole area substantially identical to those in the inner pole areas. With the one sided flux nature of MAGTP and the benefits of end pieces that terminate the stray field at both array ends, the magnetic field of the DL MAGTP array is generally very well concentrated inside the air-gap 243 of the array. There are no needs to use thick and heavy soft ferromagnetic materials to construct the array backs 241a and 241b. Instead, high-strength lightweight alloy, carbon fiber, polycarbonate materials or thin structured carbon/ferritic stainless steels can be used as optional materials for lightweight array back designs.

Still referring to FIG. 4D, between two adjacent MAGTP modules, such as between the first pole pair of MAGTPs 242a and 242b and the second pole pair of MAGTP 244a and 242b of the DL array, a MAGTP array allows a periodic inter pole gap indicated by 271 with a gap width of d, 272. One of the usages of the periodic inter pole gap in the MAGTP array design is to adjust the magnetic pitch of the array. In general, d should be within a range of (0, ½H). The spatial period λ of the array should also be equal to the sum of two MAGTP widths 224 and two inter pole gaps (λ=2nH+2d).

In accordance with the magnetic characteristics of the linkage poles of the MAGTP modules, the periodic gaps of the adjacent MAGTP modules can be filled either the non-ferromagnetic or ferromagnetic materials. Also, the filler of the periodic gaps can be a part of the array fixture design. It has been simulated by FEMM software version 4.2 that the soft ferromagnetic material will contribute flux output improvement. Accordingly, if using ferromagnetic material, including but not limited to using type 416, 430, or 455 ferritic/magnetic stainless steel to fill the gap, the benefit is twofold: the gap filler will increase rigidness of the array structure and will improve the field strength of the array.

There are three general rules to configure MAGTP FE patterns and implement the one-sided-pole operating black box functions of the pole module. First, all FE elements need to be arranged symmetrically. Second, the magnet volumes for array-normal and array-tangential (along the array extension direction) magnetizations need to be balanced. Third, FE magnet poles need to be patterned with appropriate orientations to augment the magnetic field onto the active pole side of the array while cancelling the field to near zero on the other side.

With the embodiments illustrated by 290 in FIG. 5, the segmented FE arrangement architecture for MAGTP is disclosed. MAGTP magnetization patterns comprise a set of at least two of five distinctive magnet segments each comprising a constant magnetization $FE_n$ (n=1, 2, 3, ...; $FE_1$≡FE). The MAGTP segmented angular magnetization defines that the optional array normal, center magnet segment, symbolized as [C], is +/−90° magnetized from x-axis 295a that is rightward along the array tangential direction, which is symmetrically sandwiched by a pair of optional, +/−45°-pole-rotated (relative to the center magnet magnetization), left and right mid magnet segments symbolized as $\{[M_l],[M_r]\}$. The center-mid-segment combination $\{[M_l], [C],[M_r]\}$ is further symmetrically sandwiched by an optional pair of the tangential magnetized (0/180° along the x-axis), left and right edge magnet segments $\{[E_l],[E_r]\}$ to form a general, $FE_n$ formatted MAGTP magnetization architecture $\{[E_l],[M_l],[C],[M_r], [E_r]\}$, no matter it will be physically mosaicked as assembled or glued or implemented as specially magnetized.

Considering that the one-sided, active magnetic field of MAGTP-North module (see 290b and 220b), surround the front of its active N-Pole, the operating N-Pole center of the MAGTP can be defined as a reference point with a necessity shown by 292b or 290b that a bundle of magnetization vectors of the Halbach effect MAGTP-North, comprising $\{[E_l],[M_l],[C], [M_r], [E_e]\}$, are pointed to the reference point convergently. Similarly, the active S-Pole center of MAGTP-South (see 290a and 220a), can be defined as another reference point with a necessity shown by 292a or 290a that a bundle of the magnetization vectors of the one-sided flux MAGTP-South, comprising of $\{[E_l],[M_l], [C], [M_r], [E_r]\}$, are pointed apart from this referencing center divergently. Hereinafter, the above two necessities are the general magnetization vector direction arrangement rules for the $FE_n$ segments $\{[E_l],[M_l],[C], [M_r], [E_r]\}$ of MAGTP-North and -South respectively in this invention.

Another general rule of MAGTP configuration is that the volume of center magnet segment [C] for MAGTP is designed to be substantially equal to the total volume of two edge magnet segments $\{[E_l],[E_r]\}$.

MAGTP, as a valuable FE PM array configuration, benefits from the finely segmented and arranged magnet pole orientations of this disclosure. The benefit is threefold. First, the architecture allows the implementation of innovative one-sided magnet pole modules, particularly, the MAGTP-South and MAGTP-North. Second, it allows various widths for MAGTP modules, including but not limited five preferred width options of 1 to 5 times of module thickness. Third, it allows the further improvement of the magnetic field waveforms and strengths for a selection of FE PM arrays, including implementing high fidelity sinusoidal waveforms for a selection of preferred MAGTP arrays with 5 distinctive spatial periods based on 5 preferred MAGTP widths.

There is a naming convention for the magnetization pattern indexing of MAGTP South and North hereinafter. In FIG. 5, all MAGTP FE magnetization arrangement patterns for South-pole are indexed by 3XXa, such as 302a, 322a, ..., and referenced by a common MAGTP South-pole symbolic notation 220a that shows active and linkage pole locations. As the symbolic notation 220a indicates, each MAGTP-South 3XXa has its operating South-pole at its bottom side as in FIG. 5. Similarly, all MAGTP North patterns are indexed by 3XXb, such as 302b, 322b, ..., and referenced by their common symbolic notation 220b for their pole locations. As the symbolic notation 220b indicates, each MAGTP-North 3XXb has its operating N-pole at its bottom side as in FIG. 5.

Twelve MAGTP North and South pairs with preferred FE magnetization arrangement patterns are illustrated in FIG. 5. The embodiments illustrated by 300 in FIG. 5 are the FE PM arrangement patterns of two pairs of preferred Type-I MAGTP modules. By referencing the FE PM pattern 300, a Type-I module is characterized by arranging the special rectangular prism FE magnet 122a as an array-tangential, edge magnet $\{[E_l],[E_e]\}$ and the square prism $FE_2$ magnet 143b as an array-normal, center magnet [C]. A plurality of FE magnet 122b, $FE_2$ magnet 143a, or empty element can be symmetrically sandwiched between the center and the edge magnets with +/−45° pole rotations from the center magnet magnetization vector as optional mid magnet segments $\{[M_l],[M_r]\}$ to form different width Type-I MAGTPs, such as 2H, 3H, or 4H respectively. The magnetization vector directions of the $FE_n$ segments $\{[E_l],[M_l],[C],[M_r],[E_r]\}$ are organized by necessities 292 or 290.

The detailed FE shape/pole arrangement patterns of two pairs of preferred 2H and 4H Type-I MAGTPs are illustrated by 302 and 304, in which, 302a and 302b are 2H width Type-I MAGTP-South and MAGTP-North modules respectively; and 304a and 304b are 4H width Type-I MAGTP-South and MAGTP-North modules respectively. 2H and 4H Type-I MAGTPs are special type of symmetrical, pole-functioning FE PM array modules, the arrays of which improve the regular 90 degree rotation 4-step Halbach array 106 and the 45 degree rotation 8-step Halbach array 108 with an array modularization advantage and sectional extendibility.

The embodiments illustrated by 320 in FIG. 5 are the FE PM arrangement patterns of three pairs of preferred Type-II MAGTP modules. The Type-II module is characterized by adapting a pair of MAGAP-45EC 142b, MAGAP-45CE 142c as edge components $\{[E_l],[E_r]\}$ and the square prism magnet 143b as array-normal, center magnet [C]. A plurality of FE magnets 122b, $FE_2$ magnets 143a, or nothing with +/−45° pole rotations from the center magnet magnetization form a part of optional mid $FE_n$ segments $\{[M_l],[M_r]\}$ arranged between the center and the edge components symmetrically (see 322, 324, 326) to construct different width Type-II. The magnetization vector pointing directions of all the magnetization segments are guided by necessities 292 or 290. The detailed FE shape and pole orientation patterns for preferred 3H, 4H, 5H Type-II MAGTP pairs are illustrated in 322a, 322b; 324a, 324b; and 326a, 326b respectively. The MAGTP South and North module polarity locations and orientations are indicated by their corresponding symbolic notations 220a and 220b respectively. Using the MAGAP module as edge components, Type-II MAGTPs feature smoother waveform than those of Type-I's in general, especially the smoothness along the rising and falling parts of the waveforms. Type-II configuration results in an outstanding preferred 3H Type II MAGTP with a leading field strength of all 3H width modules. Both the preferred 3H and 4H MAGTPs feature high fidelity sinusoidal waveforms.

The embodiments illustrated by 340 in FIG. 5 are the fine magnet arrangement patterns of three pairs of preferred Type-III MAGTP modules. The Type-III module is characterized by arranging the special 45-45-90 triangle prism $FE_2$ magnets 141a and 141b as center, array-normal-magnetized magnets [C], for which their hypotenuse faces are oriented as the main (or active) pole surfaces of MAGTPs. The special 45-45-90 triangle prism FE magnets 121a and 121b are arranged as edge, array-tangential-magnetized components $\{[E_l],[E_r]\}$. A plurality of special FE magnets 121c, 121e, 122b with +/−45 degree wedged magnetization to the center magnetization or empty space are arranged between the center and the edge magnetization segments symmetrically as mid magnet segment $\{[M_l],[M_r]\}$ to construct various width Type-III MAGTPs. The detailed magnet segmentation and orientation patterns for preferred 3H, 4H, 5H width Type-III MAGTP pairs are shown in 342a, 342b; 344a, 344b; and 346a, 346b respectively. As shown, the magnetization vector pointing directions of all the $FE/FE_n$ magnetization segments meet the necessities of 292 or 290. Using a wider array-normal-magnetized magnet as center piece, it enables the preferred 5H Type-III MAGTP array that is outstanding with high fidelity sinusoidal waveform. Another unique feature for Type-III MAGTPs is that they are the easiest to assemble among 5 types. Especially, the special FE PM arrangement patterns for a pair of 2H Type-III MAGTPs, 342a and 342b, makes all PM building blocks self-aligned to their desired mosaic locations just using their own magnetic attractions.

The embodiments illustrated by 360 in FIG. 5 are the fine magnet arrangement patterns of two pairs of preferred Type-IV MAGTP modules. The Type-IV module is characterized by arranging the special 45-45-90 triangular prism $FE_2$ magnets 141a, 141b as center, array-normal-magnetized magnet [C]. Contrasting to that of Type-III, the hypotenuse faces of Type-IV are oriented on to the opposite side of the main active pole surfaces of MAGTPs. The FE magnets, 121a, 121b, and 122a are selectively arranged as edge, array-tangential-magnetized segments $\{[E_l],[E_r]\}$. A plurality of FE magnet 121d, 121c, 121e, 122b are magnetized with a +/−45° wedge to the center magnetization of [C] and are arranged between the center and the edge segments symmetrically as 360 illustrated as mid magnet segments $\{[M_l],[M_r]\}$. The mid segment width controls various width of Type-IV MAGTP modules, including the preferred 4H, and 5H width Type-IV MAGTPs. The detailed FE patterns of 4H and 5H Type-IV MAGTPs are shown in 362a, 362b; 366a, 366b. As shown, the magnetization vector pointing directions of all the $FE/FE_n$ segments are arranged according to the necessities 292 or 290. The peak field strengths of Type-IV modules are the strongest among all five types. This arrangement results in the strongest magnetic repelling force between the center and its neighborhood mid magnet segments and need either extra assembly efforts or special magnetization procedures to make the inner segments $\{[M_l], [C], [M_r]\}$ integrated as an easy-to-use $FE_n$ module, which will increase cost. According to performance analysis, only 4H and 5H width Type-IV MAGTPs are preferred as options.

The embodiments illustrated by 380 in FIG. 5 have the most simple magnet arrangement mosaics for two pairs of preferred Type-V MAGTP modules. The Type-V module is characterized without array-normal [C] segment and array-tangential-magnetized segments $\{[E_l],[E_r]\}$. It just pairs a plurality of 45 degree magnetized special rectangle prism FE magnets 122a or $FE_2$ magnet 143a side by side in a special wedge orientation arrangement guided by necessities 290 or 292. Particularly, the Type-V MAGTP-South consists of a right magnet $[M_r]$ with a 45° magnetization orientation from x-axis and a left magnet $[M_l]$ with 135° pole orientation from x-axis as shown by embodiments 382a and 384a. The MAGTP-North consists of a right magnet $[M_r]$ with a −135° magnetization orientation and the left magnet $[M_l]$ with a −45° magnetization orientation as shown by embodiments 382b and 384b. Type-V gives an excellent one sided flux effect and is particularly suitable to make narrow width MAGTPs, including unique very narrow MAGTP and the preferred outstanding 2H Type-V MAGTP featuring high fidelity sinusoidal waveform.

Figure 6:
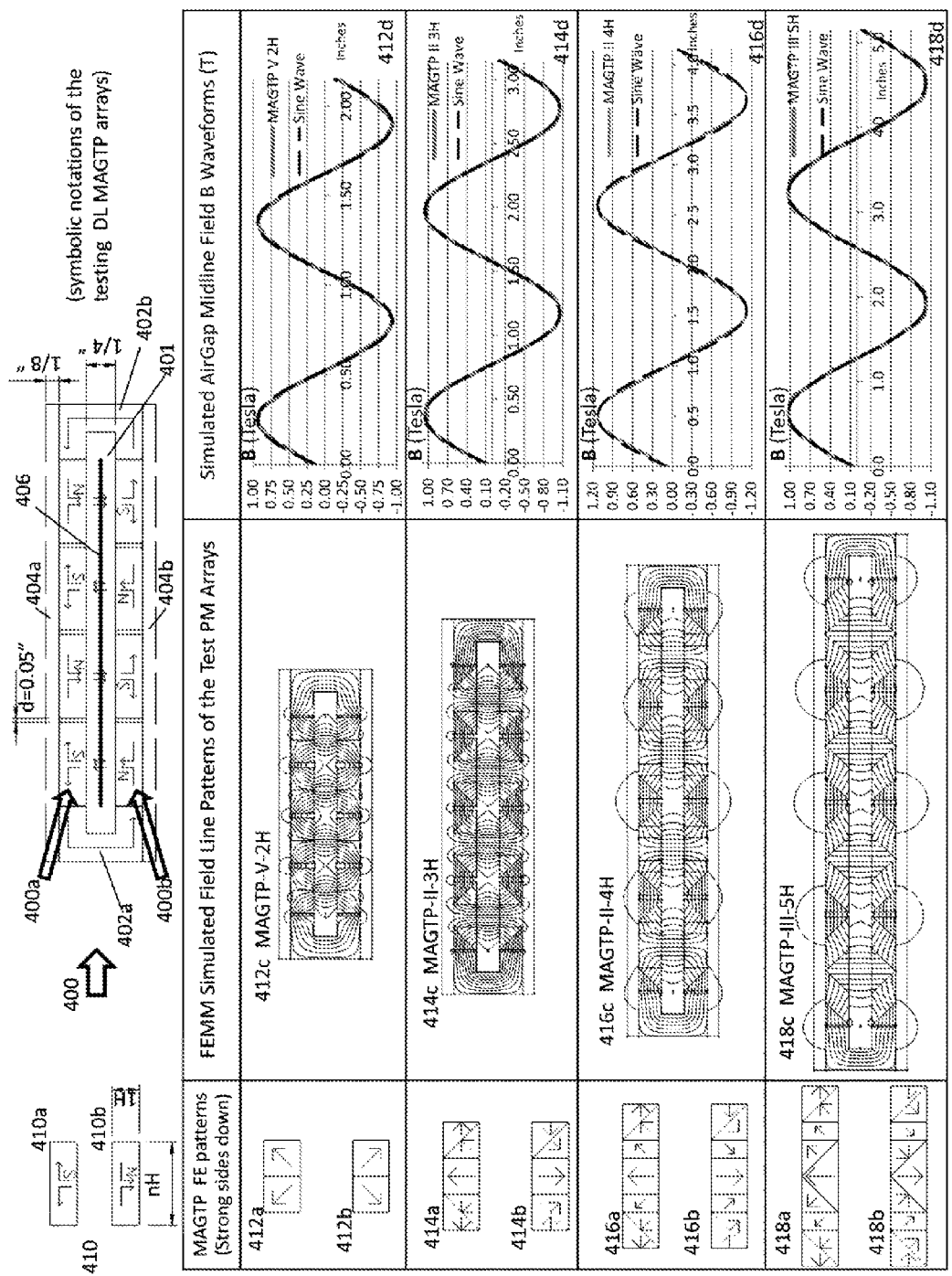
FIG. 6 illustrates the magnetic field lines and air-gap field waveforms of 4 MAGTP Arrays.

Extensive experiments, including computer magnetic field simulations, real FE PM array configuration tests, and FE magnet array based servo-motor integration tests, have been conducted for the development of high performance FE PM array configurations, array devices, and array based machines. First, FEMM version 4.2 has been used for the magnetic field simulation of various FE magnet arrays, including the five types of MAGTPs and their 12 preferred FE magnet pattern arrangements. FIG. 6 illustrates the magnetic field line patterns and the air-gap field waveforms of 4 preferred sinusoidal MAGTP Arrays using FEMM 4.2 simulation.

The embodiment illustrated by 400 in FIG. 6 is the symbolic notation of Double Layer (DL) MAGTP arrays used for all MAGTP performance simulation tests within this disclosure, including those for the 4 pair of preferred MAGTP modules presented in FIG. 6. The DL MAGTP array 400 consists of an upper MAGTP array 400a and a lower MAGTP array 400b with total four pairs of MAGTP modules producing an alternative magnetic field with two spatial periods. The MAGTP array device is retained by 2 layers of array backs 404a, 404b and 2 soft ferromagnetic end pieces 402a, 402b. An air-gap 401 is confined between the lower and upper layers with a special width of 0.25 inches for simulation. Two types of lightweight array backs made of non-ferromagnetic aluminum alloy/carbon fiber and ⅛ inch thick ferromagnetic steel/stainless steel respectively are selected for the simulation. Taking advantage of the special linkage port feature of MAGTP, air and ferromagnetic materials are two optional simulation materials filling into the periodic, adjacent MAGTP space d, which is always 0.05 inches for the simulation. The magnet material selected for simulation is N52 Neodymium Iron Boron (NdFeB).

By referring to the first table column in FIG. 6, the FE PM patterns of four pairs of specially configured MAGTP module, (412a, 412b), (414a, 414b), (416a, 416b), (418a, 418b), are presented, which construct high-fidelity sinusoidal MAGTP arrays with module widths 2H (Type-V), 3H (Type-II), 4H (Type-II), and 5H (Type-III) respectively. The polarities of these module pairs are indicated by their symbolic notations (410a, 410b) on the up left corner of table.

By referring to the second column of FIG. 6, the FEMM 4.2 simulated magnetic field line patterns of the four testing PM arrays are presented. In these field line pattern simulations, aluminum is selected as the back 404a, 404b material and air is filled in the periodic, adjacent MAGTP space d. These line patterns, 412c for MAGTP-V-2H, 414c for MAGTP-II-3H, 416c for MAGTP-II-4H, 418e for MAGTP-III-5H, show that all four different width MAGTP modules have excellent one sided flux property with almost all magnetic field flux confined inside their air-gaps and negligible stray fields outside the array devices.

By referring to the third column of FIG. 6, the FEMM 4.2 simulated magnetic field waveforms of the four PM arrays are presented. Each of the waveforms is obtained along the midline 406 of the air-gap. In these waveform simulations, 404a, 404b are thin, ⅛ inch steel backs; air is filled in the periodic, adjacent MAGTP space d.

To examine the sinusoidal fidelity of the testing MAGTP waveforms, four theoretical sinusoid references, which are assigned with the spatial periods and peaks that are the same to those of four corresponding testing waveforms, are presented in a dotted plot and paired with the corresponding MAGTP waveform plots. These waveform plots, with 412d for MAGTP-V-2H, 414d for MAGTP-II-3H, 416d for MAGTP-II-4H, 418d for MAGTP-III-5H, show that four preferred MAGTPs are excellent high fidelity sinusoidal FE PM arrays. In addition, all of these MAGTP arrays have peak field strength at about 1 Tesla or higher in their air-gap.

FIG. 7 is the performance specifications of 12 preferred fine element patterned MAGTPs illustrated in FIG. 5. The performance specifications are derived from the FEMM 4.2 generated Normal Flux Density data along the referencing air-gap midline 406 of the DL array 400 of FIG. 6.

By referring to the second column of FIG. 7, the FE Patterns of MAGTP-North are listed as symbolic index for the preferred MAGTPs in their simple/concise $FE_n$ format. The simple/concise $FE_n$ format means that when adjacent magnet elements within $FE_n$ have a constant magnetization, the $FE_n$ is equivalent to and is represented as a single piece of $FE_n$ shaped and substantially identical magnetized magnet.

By referring to FIG. 7, the "Average Airgap Field |B| (Tesla)", "Peak AirGap Field |B| (Tesla)", and "AirGap-Field/Sinusoid Area Ratio (%)" data are listed as three performance estimates of the tested arrays. The AirGap-Field/Sinusoid Area Ratio (%) is defined as the ratio of the integrated areas of the AirGap Waveform of MAGTP array and the corresponding sinusoid. It is written as $\overline{\text{AirGapField/Sinusoid}}$. The AirGap Waveform is the plot or shape of the normal flux density distribution along the midline of the MAGTP array air-gap and that is written as $$f_{MAGTP}(x_n) = B_{Normal}(x_n);$$

The sinusoid is a mathematically created function and expressed as $$f_{Sine}(x_n) = |B_{NormalPeak}| * \sin\left(2\pi \frac{x_n}{\lambda}\right); \lambda = 2nH + 2d,$$

where the amplitude of the sinusoid $f_{Sine}(x_n)$ is defined as the peak $|B_{NormalPeak}|$ of $B_{Normal}(x_n)$; the spatial period $\lambda$ of the sinusoid $f_{Sine}(x_n)$ is defined the same to the air-gap waveform period of $2nH+2d$; and the x coordinate samples, $x_n$, of the sinusoid is phase locked to that of the air-gap wave $B_{Normal}(x_n)$. By creating $f_{Sine}(x_n)$ using above definitions, the area ratio of the $f_{MAGTP}(x_n)$ and $f_{Sine}(x_n)$, $\overline{\text{AirGapField/Sinusoid}}$, can be reasonably thought as the wave shape matching gauge that tells how well the MAGTP air-gap wave shape matching that of the ideal Sinusoid. Considering that (1), $f_{MAGTP}(x_n)$ and $f_{sine}(x_n)$ have been locked with the same amplitude, period, and phase and (2) $f_{MAGTP}(x_n)$ is known as substantially sinusoidal or quasi-sinusoidal and mathematically smooth, the "$\overline{\text{AirGapField/Sinusoid}}=100\%$" is more than a necessity that the MAGTP air gap waveform shape is a precise match to that of the ideal sine wave. And in general, "$\overline{\text{AirGapField/Sinusoid}}>100\%$" means the MAGTP air gap waveform width at the half height of its amplitude is wider than that of the ideal sinusoid reference. Similarly, "$\overline{\text{AirGapField/Sinusoid}}<100\%$" means that the half-amplitude width of MAGTP waveform is narrower than that of an ideal sine wave reference in general.

FIG. 7 compares the performance variations in "base", "iron back" and "iron filler" configurations. The "base" configuration means the MAGTP array 400 are retained by a pair of ferromagnetic end pieces and a pair of non-ferromagnetic backs with air filling in the periodic, adjacent MAGTP space d. The "iron back" configuration differs from the "base" by using a pair of ⅛ inch thick ferromagnetic backs to replace the non-ferromagnetic backs. The "iron filler" differs from the "iron back" one by using ferromagnetic material to replace air in the periodic, adjacent MAGTP space d. The ferromagnetic material of selection for FEMM 4.2 simulation is 1020 low carbon steel.

By referring to FIG. 7, all 12 preferred MAGTPs have a strong magnetic field property and are capable of providing field strength above 1.0 Tesla for MAGTPs with a width ≥3H. The strongest field strength of 1.218 Tesla is achieved by the MAGTP-Type-IV-5H (366a, 366b) based array. The strongest average field strength of 0.705 Tesla is achieved by the MAGTP-Type-IV-4H (362a, 362b) based array. The ⅛ inch thin iron backs can improve air-gap field average and peak strengths averaged at above 9.8% and 9.4% respectively. By adding iron into the periodic, adjacent MAGTP space d, we observe an improvement of air-gap field average and peak strength averaged at 2.3% and 0.5% respectively.

By referring to FIG. 7, five best sinusoidal MAGTP array configurations for five different MAGTP widths are shown as MAGTP-Type-V-1H, (382a, 382b), MAGTP-Type-V-2H, (384a, 384b), MAGTP-Type-II-3H, (322a, 322b), MAGTP-Type-II-4H, (324a, 324b), and MAGTP-Type-III-5H (346a, 346b), giving a high fidelity sinusoidal waveform with area mismatching less than +/−3% according to the AirGapWave/Sinusoid Area Ratio (%) estimates. All the rest 7 MAGTPs are also substantially sinusoidal as their AirGapWave/Sinusoid Area Ratio (%) indicated. It also should note that by adding iron into the periodic, adjacent MAGTP space d, AirGapWave/Sinusoid Area Ratio (%) will increase 1.7%. That means the shape of MAGTP air-gap waveform is getting a little wider.

The improved sinusoidal flux, high peak field strength, and one-sided flux approximation without absolute needs of ferromagnetic back are key advantages of various width MAGTP array devices. However, there are certain tradeoffs to MAGTPs when using non-ferromagnetic backs, including that 1) certain performance, particularly, the average field strength of MAGTP, is less ideal; 2) it is also a restrictive requirement for MAGTP that the center normal magnetized volume needs to be substantially equal to the volume of the edge tangentially magnetized volume. This requirement makes MAGTP less adaptive if the pole module shape needs to be altered from the cuboids.

For applications that desire more flexibly sized and shaped magnet poles and higher average field strength, a Magnet Assembly Grouped with Y-characteristic Polarity (MAGYP, or Mag-Y-Pol) is conceptualized and designed as a lightweight, ferromagnetic-back-aided hybrid Halbach module. The goal of MAGYP is to extend MAGTP with extra flexibilities for various module designs, including more width, shape, and waveform options, and/or stronger average magnetic field strength.

In certain embodiments, a pair of MAGYP modules 430 in FIG. 8A is conceptualized as a pair of magnetic black boxes and illustrated by the perspective drawings of cuboids 432a, 432b.

MAGYP arranges more array-normal magnetized materials than the array tangential materials with appropriate pole orientation patterns to constructively builds up magnetic field on the operating pole side (South 434a or North 434b) of the module and destructively reduce field on the non-operating back side to implement a quasi-one-sided flux. In this design, the unconfined non-operating field magnetic field on the back side is generally designed to be less than ½ of the self-confined operating field in the front of the main pole; and two side faces adjacent to the main South/North pole faces of MAGYP either function as magnetic links to interface with adjacent MAGYP modules or are terminated by end pieces. A thin layer of ferro-back for MAGYP array, such as ½ to ⅓ thick to that of a regular U-channel PM array, is needed to provide magnet circuits that redirect the unconfined magnetic field on the back into the active field side. Considering the active field flux concentration of MAGYP are partially contributed by the magnetic linkage ports on two side faces and one back face of the black box, the linkage magnetic field drawings are imitated as Y-styled as shown by 436a, 436b; 438a, 438b. A pair of symbolic arrow sets 440a and 440b on the top faces of the MAGYP 432a, 432b explicate the magnetic circuit functions of the MAGYP modules and the magnetic polarities of 4 faces of each of the black boxes.

The embodiments illustrated by 450 in FIG. 8B is a pair of perspective drawings of isosceles trapezoid prism shaped MAGYP modules (450a, 450b). A plurality of the trapezoid prism shaped MAGYP pairs (450a, 450b) can be aligned to form arc, circular, or curvilinear shaped FE PM arrays for sectional arc, curvilinear, and rotary motor applications.

The embodiments illustrated by 440 in FIG. 8C shows a pair of symbolic notations 440a, 440b in a planar schematic drawing style for a pair of MAGYP black boxes. The symbolic arrow sets 440a and 440b explicates locations and magnetic polarities of the active and interface poles on four special faces of MAGYP.

The embodiments illustrated in FIG. 8D shows a general configuration of a DL alternating pole MAGYP array 460 to provide a periodic magnetic field typically for cureless linear and curvilinear motor applications. The DL MAGYP array consists of upper and lower MAGYP arrays (462a, 464a, . . . , 468a) and (462b, 464b, . . . , 468b), each of which consists of a plurality of alternating MAGYP South and North modules in cuboid or isosceles trapezoid prism shape (432a, 432b; or 450a, 450b) exhibiting alternating flux distribution in the front active face of the array. Two layers of the DL arrays are arranged with their active sides facing each other and the center points of S-poles of the upper array being aligned precisely above the center points of the N-poles of the lower array, making active fields from upper and lower arrays constructively superimposed with an enhanced resultant alternating field 472, 474, . . . , 478. Two thin soft ferromagnetic backs 461a, 461b with a thickness 467 and two end pieces 472a, 4726 provide structure and magnet circuits 474a, 474b; 476a, 476b for the DL array. The arrangement forms an air-gap 463 between DLs with a width 465, in which the active field is confined and an ironless current-carrying coil is energized to drive the motion payload. Periodic gaps, as referred by 478, of adjacent MAGYP modules are allowed with a width d. Optional ferromagnetic materials can be filled into the gaps for the structural and field enhancement.

Figure 9:
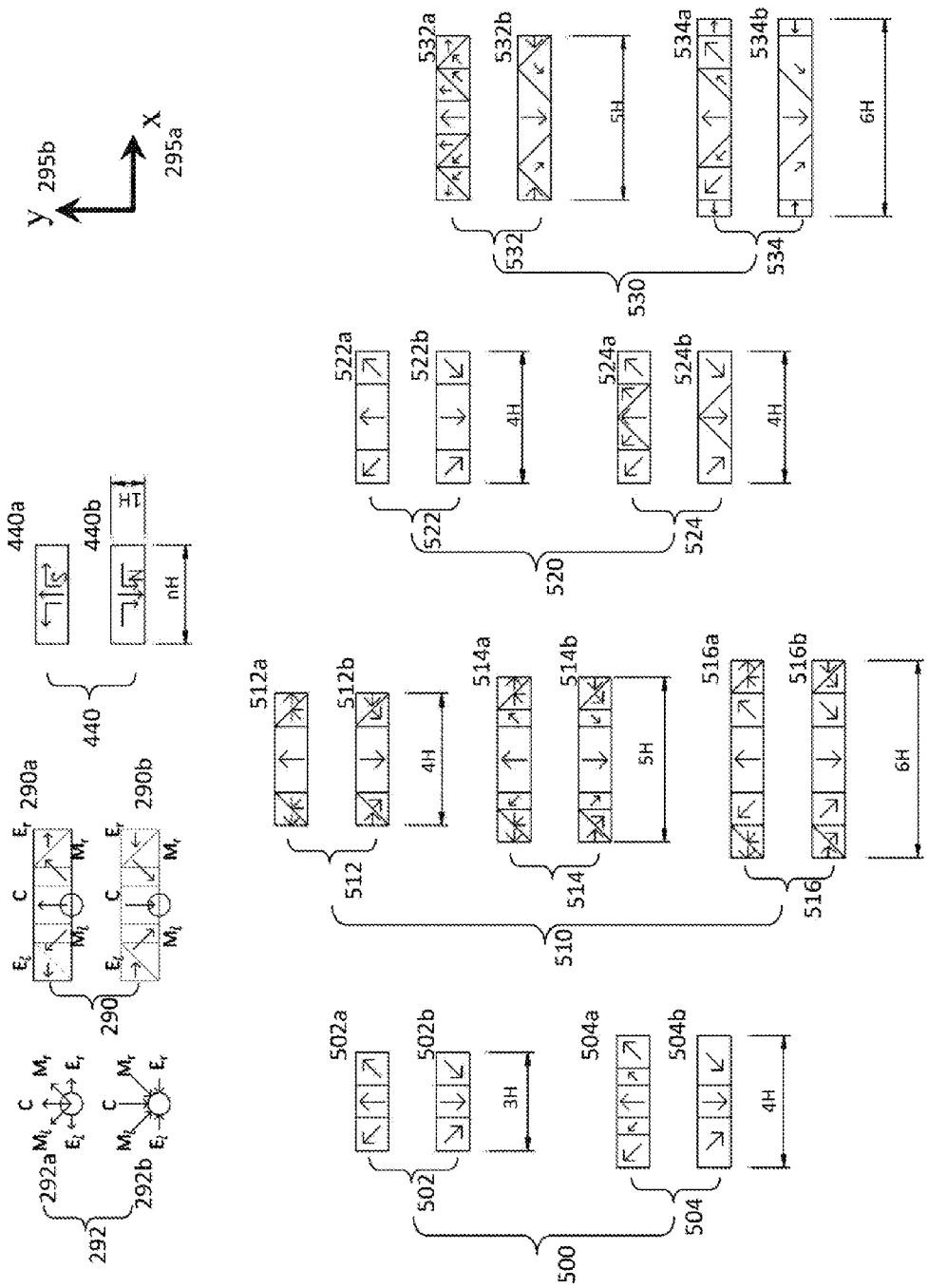
FIG. 9 illustrates FE magnetization arrangement patterns of 9 pairs of preferred MAGYP South and North modules in 4 types.

FIG. 9 illustrates embodiments of the fine element patterns of 4 types of MAGYPs. By adapting lightweight ferro-back aids, MAGYP allows using more array-normal PM materials than the array tangential PM materials for achieving higher average field strength, more flexible pole shape, and wider waveform options than those of corresponding MAGTPs. In general, Type-I MAGYP is a modification of Type-I MAGTP by removing the array-tangential magnets. It features high average field strength and high quality sinusoidal waveforms, and particularly for its 3H and 4H width modules. Type-II MAGYP doubles the width of the center PM segment of that of Type-I and adapts MAGAP for their edge part pieces, resulting strong average field strength with a waveform shaped between sinusoid and the trapezoid. Type-III MAGYP differs from Type-I by using a wider center PM piece, giving a wider shaped waveform option in quasi-sinusoid/trapezoid. Type-IV MAGYP is evolved from Type-IV MAGTP, with improved average strength and great sinusoidal waveform results for 5H and 6H. The MAGYP center magnet piece can be designed as isosceles trapezoid prism shaped for optional fan shaped MAGYP modules.

In the embodiments illustrated in FIG. 9, a Cartesian coordinate system and a set of naming/notation convention rules are used to specify MAGYP pole arrangements. First, the Cartesian coordinate system defines that the x-axis points rightward along the array tangential direction and the y-axis points upward aligned with the array normal direction. The positive rotations are anticlockwise and negative rotations are clockwise. Second, a public symbolic notation 440*a* is used to indicate the active pole and side/back interface polarities of all MAGYP South-pole patterns referred by 5XXa, such as 502*a*, 522*a*, . . . in FIG. 9. As the symbolic notation indicates, each 5XXa MAGYP pattern has its main South-pole at its bottom side. Similarly, all the MAGYP patterns identified by 5XXb, such as 502*b*, 522*b*, . . . , are for MAGYP North-poles, which are notated by a public symbolic notation 440*b*, and as the notation indicates, 5XXb models having their main North-poles located on the bottom sides. Third, a deliberated drawing convention illustrates all 5XXa South-pole arrangement patterns with more FE details, while 5XXb North-pole patterns are purposefully drawn with concise $FE_n$ shapes if a contained $FE_n$ segment with a uniform magnetization direction. Simply, different drawing methods for 5XXa and 5XXb are equivalent because an assembled $FE_n$ that has its adjacent FE magnetizations aligned along the same direction is equivalent to a fused single piece $FE_n$ that is magnetized substantially the same to that of the assembled $FE_n$.

With the embodiments illustrated by 290 in FIG. 9, a segmented MAGYP FE arrangement architecture is disclosed. The architecture comprises of symmetrically arranged magnet patterns with at least three of five distinctive magnet segments—the array normal, +/−90° magnetized to x-axis, center magnet segment [C], is symmetrically sandwiched by a pair of +/−45°-pole-rotated (relative to the center magnet magnetization), left and right mid magnet segments $\{[M_l],[M_r]\}$. The center-mid-segment combination $\{[M_l],[C],[M_r]\}$ is further symmetrically sandwiched by an optional pair of the tangential magnetized (0/180° along the x-axis), left and right edge magnet segments $\{[E_l],[E_r]\}$ to form a general MAGYP magnetization pattern $\{[E_l],[M_l],[C],[M_r],[E_r]\}$. This pattern can be physically mosaicked as assembled or glued or implemented as specially magnetized. Similar to the necessity of MAGTP, for the MAGYP-North, 290*b*, 440*b*, with it operating field formed in the front of N-Pole of its center magnet [C], has a necessity that a bundle of magnetization vectors 292*b* from its $\{[E_l],[M_l],[C], [M_r], [E_r]\}$ segments are arranged pointing toward its operating N-Pole center (referring to 290*b*, 292*b*) convergently; for the MAGYP-South, 290*a*, 440*a*, with is operating field formed in the front of S-Pole of its center magnet [C], has a necessity that a bundle of magnetization vectors of the magnet pattern $\{[E_l],[M_l],[C],[M_r],[E_r]\}$ are arranged pointing apart from operating S-Pole center (referring to 290*a*, 292*a*) divergently.

The embodiments illustrated by 500 in FIG. 9 are the FE arrangement patterns of two pairs of preferred Type-I MAGYP modules. By referring to the configuration patterns 500, Type-I module is characterized by arranging a square prism $FE_2$ magnet 143*b* (or its isosceles trapezoid prism shaped equivalent) with +/−90 degree magnetizations to x-axis, as an array-normal, center magnet. A pair of rectangular shaped $FE_n$ with +/−45°-pitched magnetizations, which are magnetized along +/−45 degree lines to the array normal magnetic vector and arranged as either pointing toward the active N-Pole center convergently or pointing apart from the operating S-Pole center divergently, sandwich the center magnet to form MAGYP North and South respectively. The +/−45° magnetized $FE_n$ magnet consists of either a FE magnet 122*b*, or a $FE_2$ magnet 143*a*, or combination of FE magnet 122*b* and $FE_2$ magnet 143*a* to form a Type-I MAGYP with different widths, such as 3H or 4H respectively. The detailed FE pole orientation patterns of two pairs of preferred 3H and 4H Type-I MAGYPs are illustrated by 502 and 504 respectively.

The embodiments illustrated by 510 in FIG. 9 are the fine magnet arrangement patterns of three pairs of preferred Type-II MAGYP modules. Type-II module is characterized of adapting a pair of MAGAP-45EC 142*b*, MAGAP-45CE 142*c* as edge components and a double width magnet that consists of two FE) magnets 143*b* (or an isosceles trapezoid prism shaped option) with +/−90 degree magnetizations to x-axis, as array-normal, center magnets. A pair of rectangular shaped $FE_n$s with +/−45°-pitched magnetizations, which are magnetized +/−45 degree to the array normal magnetic vector and arranged as either pointing toward the active N-Pole center convergently or pointing apart from the S-Pole center divergently, are arranged between the center and the edge components symmetrically (see 512, 514, 516) to construct different widths of Type-II MAGYPs respectively. The detailed FE pole orientation patterns for preferred 4H, 5H, 5H Type-II MAGYP pairs are illustrated in (512*a*, 512*b*); (514*a*, 514*b*); and (516*a*, 516*b*) respectively. Their active pole locations and orientations are indicated by their corresponding symbolic notations 440*a* and 440*b* respectively. Using FE MAGAP module as edge components, Type-II MAGYPs feature smooth rising and falling curves in their waveforms with strong average fields with a waveforms shaped between sinusoidal and the trapezoidal waves.

The embodiments illustrated by 520 in FIG. 9 are the fine magnet arrangement patterns of two pairs of preferred Type-III MAGYP modules. By comparison of the configuration patterns Type-I 500 and Type-III 520, Type-III module differs from Type-I by arranging a 2H wide magnet unit or its isosceles trapezoid prism shaped transform as the array-normal magnetized, center magnet. A pair of rectangular $FE_n$s with +/−45°-pitched $FE_n$ magnetizations, which are magnetized +/−45 degree to the array normal magnetic vector and arranged as either pointing toward the active N-Pole center convergently or pointing apart from S-Pole center divergently, sandwich the center magnet to form MAGYP North and South respectively. Each +/−45°-pitch magnetized $FE_n$ consists of either a FE magnet 122*b*, or a $FE_2$ magnet 143*a* to make Type-II MAGYPs with different widths, such a 4H width. The detailed FE pole orientation patterns of two pairs of preferred 4H Type-III MAGYPs are illustrated by 522 and 524, in which, (522*a*, 522*b*) and (524*a*, 524*b*) are 4H Type-III (MAGYP-South, MAGYP-North) module pairs with two different waveform options.

The embodiments illustrated by 530 in FIG. 9 are the fine magnet arrangement patterns of two pairs of preferred Type-IV MAGYP modules. The Type-IV module adapts an isosceles trapezoid $FE_4$ magnet, which consists of a $FE_4$, as the combination of (121*a*, 143*b*, 121*a*) or (121*b*, 143*b*, 121*b*), with the same +/−90 degree magnetizations to the x-axis, as the array normal magnetized, center magnet. The small parallel face of the isosceles trapezoid $FE_4$, is arranged as the main pole surfaces of Type-TV MAGYPs. The FE magnets 121*a*, 121*b*, or 122*a* are arranged as edge, arraytangential-magnetized magnet components. A pair of +/−45°-pitch magnetized $FE_n$s, which are magnetized +/−45 degree to the array normal magnetic vector and arranged as either pointing toward the active N-Pole center convergently or pointing apart from the S-Pole center divergently, are arranged between the center and the edge components symmetrically as illustrated in 530 to construct various width Type-IV MAGYPs, including the preferred 5H, and 6H width Type-IV MAGYPs. The detailed FE patterns of 5H and 6H Type-IV MAGYPs are shown in 532a, 532b; 534a, 534b. The Type-IV configuration produce strong field and implement a unique sinusoidal waveform solutions for 6H width. This arrangement can be implemented by a special assembly or more cost effectively by the special magnetization processes that the structure itself allows.

Figure 10:
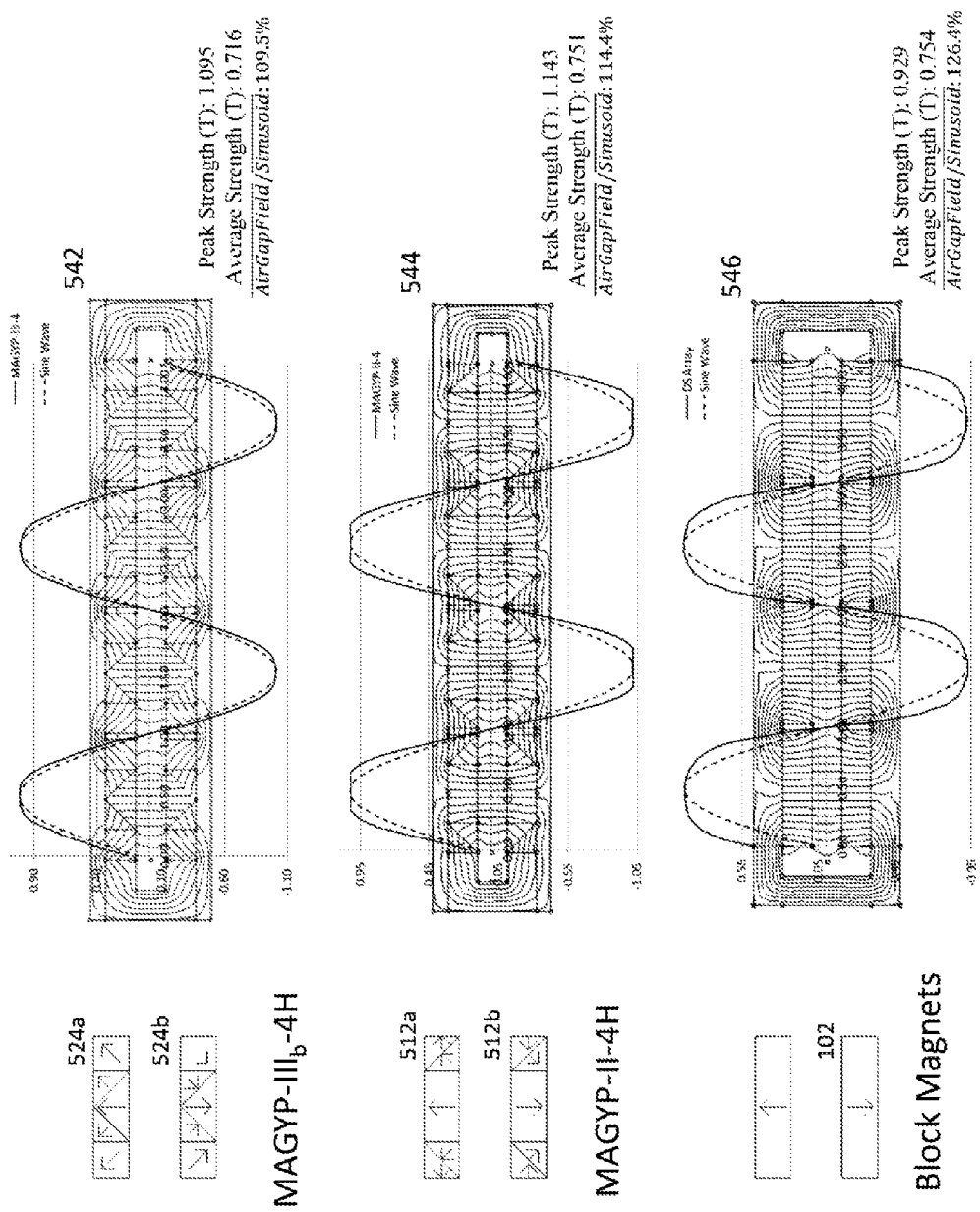
FIG. 10 illustrates the magnetic field lines and air-gap field waveforms of 2 preferred MAGYP arrays in comparison with those of a DL block PM array.

FIG. 10 illustrates and compares the line patterns and the magnetic flux density distribution plots (or waveforms) of (1) two preferred 4H width MAGYP DL array devices 542, 544 consisting of MAGYP-IIIb-4H module (524a,524b) and MAGYP-II-4H (512a, 512b) respectively; and (2) a 4H width conventional DL block magnet device 546 consisting of block magnets 102 in a york. For effective visualization, the FEMM simulated waveforms along the mid-lines of the air gaps of the three testing PM devices are overlapped on to their corresponding magnet arrangement patterns and field line patterns in FIG. 10. The FEMM simulations provide waveform shapes, the Peak Strength (T), Average Strength (T) and $\overline{\text{AirGapField/Sinusoid}}$ ratios for these two preferred MAGYP devices 542, 544 and a conventional DL block magnet device 546. The waveform plot comparison tells out general advantages of MAGYP device, including having: (1) higher peak strength than that of a conventional block PM array, (2) almost the same average strength to that of a conventional block PM array device, and (3) thinner back and simpler back structure than those of a conventional block PM array in a U-shaped york and hence allowing a lightweight array design.

FIG. 11 is the FEMM 4.2 performance data sheet of 9 MAGYP array devices and a block PM array device. Each MAGYP array testing device consists of dual layer PM pole modules with 2 spatial periods that tests 9 preferred fine element MAGYP pole modules illustrated in FIG. 9. The FE magnetization patterns of the MAGYP-North module are listed as symbolic index for the corresponding preferred MAGYPs in the second column of the table. The "Average Airgap Field |B| (Tesla)", "Peak AirGap Field |B| (Tesla)", and "$\overline{\text{AirGapField/Sinusoid}}$ Ratio (%)" are three performance estimates that are defined the same as those in FIG. 7. These performance data are estimated by using the FEMM 4.2 software, which are obtained from the Normal Flux Density plot along the midline of the air-gap 463 of the testing DL MAGYP array 460 of FIG. 8D.

By analyzing FIG. 11 data sheet, all 9 preferred MAGYPs have a strong magnetic field property and all are capable of providing significantly higher average field strength than those obtainable from MAGTPs. The average of the average field strengths of 9 MAGYPs is 0.737 Tesla that is 17% higher than the corresponding average of 0.629 Tesla for 12 MAGTPs. The peak field strength of these 9 MAGYPs are all above 1.0 Tesla with average peak field strength at 1.11 Tesla. Adding iron into the periodic space d between the adjacent MAGYPs can improve the average and peak field strengths in the air-gap averaged at 1.6% and 1.5% respectively. In addition, 9 preferred MAGYPs have a wide range of $\overline{\text{AirGapField/Sinusoid}}$ ratios, indicating that the waveforms of MAGYPs have a lager shape option. Particularly, a wide, 6H width Type-IV MAGYP module (534a, 534b) is sinusoidal with a $\overline{\text{AirGapField/Sinusoid}}$ near 100%.

By referring to FIGS. 10 and 11, air-gap magnetic field properties of various MAGYPs and a traditional PM array device in a U-shaped york are compared. In general, adaptable sinusoidal or quasi-sinusoidal flux waveform, high peak field strength, and thinner ferromagnetic back and simpler back structure are key advantages of various width MAGYP array devices. It is also interesting that the preferred Type-IIIa 4H MAGYP have a little stronger average magnetic field strength than that of the block magnet U-shaped iron back assembly, indicating that the hybrid-Halbach characterized MAGYP array can have its active field flux concentrated better than the thick iron back U-channel assembly.

In certain embodiments, the lightweight linear and curvilinear FE PM tracks retained in elegantly structured fixtures are part of the products of this invention. The FE MAGTP and MAGYP modules are the array components for these tracks. FIGS. 12A-12D illustrates a specially designed dual layer arc shape magnet track comprising MAGYP modules. A matching or compatible three-phase current-carrying ironless core coil 662a-1 and 662a-2 in FIG. 14A, which may be embodied by an Original Equipment Manufacturer (OEM) device, such as a Model LMCF02C-HCO made by H2WTech, 26380 Ferry Court, Santa Clarita, Calif. 91350, is used as a sliding forcer for this MAGYP magnet track. When being energized, the forcer drives the motor payload along the air-gap 612 of the track for curvilinear actuation.

The embodiments illustrated by a series of drawings 600a, 600, 600c for an arc shaped FE PM track in FIGS. 12A-12D respectively are constructed using periodic fan-shaped, Type-II-4H MAGYP-South/North pairs (512a, 512b). FIG. 12A is an engineering drawing that shows the shape and dimensions of the fan-shaped, Type-II-4H MAGYP module, in which, it adapts a specially shaped isosceles trapezoidal prism 612 as the array-normal-magnetized, center magnet. The center magnet is sandwiched by a pair of standard FE MAGAPs. The center magnet 612, with its wedge angle of 12° and a nominal inner and outer radius 5.29 inch and 6.29 inch respectively dominates the Type-II-4H MAGYP shape and dimensions for this particular array. FIGS. 12B and 12D are two different perspective 3D engineering drawing to shows the device fixture structure and the assemblies of the MAGYP modules. In FIG. 12B, two end pieces 604a, 604b and two backs 602a, 602b of the MAGYP DL array are typically made of easy-to-machine magnetic 416 stainless steel, which can be further pocketed for a lighter weight structure, all of which are actually benefited by the self-augmented field concentration of MAGYP.

FIG. 12C shows front-face magnetization pattern of the curvilinear DL FE PM track. Together with FIGS. 12B and 12D, the magnetization arrangement of the MAGYP modules are shown by 622a-f and 624a-f. The materials that filled in to the periodic, adjacent MAGYP module spaces can be either ferritic stainless steel of the back, or customized tangentially magnetized PM as shown by 606a-f, 608a-f, which are a plurality of customized, tangentially magnetized magnets are filled into the periodic, adjacent MAGYP module spaces with their pole orientations arranged pointing from its adjacent MAGYP South module to an adjacent MAGYP North module as indicated by 600b. In comparison with a conventional U-channel magnet array track that uses ¼ inch thick steel backs, this MAGYP track is about 50% lighter in weight and significantly compact. The FEMM simulation also shows that this ⅛ inch thick ferritic stainless steel backs based MAGYP array with a FE arrangement pattern shown in 600b has an improved magnetic field density distributions—with 9.1% improvement in peak and 12% better in waveform factor (defined by $\overline{\text{AirGapField}}$/Sinusoid).

The embodiment illustrated in FIGS. 13A-13D shows another type of lightweight structured fixture for constructing FE MAGTP/MAGYP array devices. FIG. 13A shows non-transparent metal alloy 657a and transparent 657b polycarbonate push-on-trim-channel fixture available from McMaster-Carr (www.mcmaster.com) at 200 New Canton Way, Robbinsville, N.J. 08691-2343, which can be adapted as mechanical retaining components for FE PM arrays. The $\frac{1}{16}$ inch thick carbon fiber composite and the $\frac{1}{64}$ inch thick non-magnetic stainless steel are another two optional materials as the push-on-trim-channel components. Referring to drawing 657a, 657b, the base size A, leg size B, and thickness size C of the channel are the dimensional symbols of the push-on-trim channel. For the particular fixture illustrated in FIGS. 13B-D, the COST aluminum and polycarbonate push-on-trim-channels are selected with dimensions A=0.25 or 0.375 inches, B=$\frac{7}{16}$ inches, and C=$\frac{1}{16}$ inches, and the FE magnets have a unit width 1H=0.25 inches. When dimensions A is selected as 0.375 inches, an 1 inch wide ferritic 430 stainless steel sheet 655 with appropriate thickness such as $\frac{1}{16}$ can be arranged on the array back to provide an auxiliary magnet circuit.

FIG. 13B illustrates how to assemble FE PM pole modules into a pair of push-on-trim-channels. Various MAGTP/MAGYP modules can be inserted or encapsulated into array devices using these channels. FIG. 13C is a front-face view of the magnetization pattern of a particular FE PM array retained within the U-Shaped push-on-trim-channels. The preferred embodiment 650 shows an example set 652 of MAGTP Type-III 4H South and North pole modules 344a, 344b can be inserted into a pair of U-Shaped 657 push-on-trim channels. FIG. 13D consists of a front and a side view of the FE PM array device in which MAGTP Type-III 4H South and North pole modules are positioned in U-Shaped push-on-trim-channels and further retained by adding two end pieces 659a and 659b. This push-on-trim-channel retaining design is a cost-effectively retaining solution for MAGTP/MAGPY array devices.

The embodiment illustrated in FIGS. 14A-14C consists of a set of FE PM linear and curvilinear motor systems shown in 3D drawings 660a, 660b, and 660c respectively. Each of the system consists of a FE PM track stator and a preferred sliding winding coil forcer. The forcer is energized in the air-gap of its corresponding magnet stator to drive the motion payload. This set of motor systems will address various applications for the aerospace system engineering, industrial automation, metrology, and robotics. The invention is particularly useful for these applications, as the special motor performance in terms of high power and force/toque densities, high acceleration and short settling time, high accuracy, range, and modular extendibility, and low acoustic noise, must be optimized and SWaP must be minimized.

FIG. 14A illustrates a preferred embodiment of a slim FE PM arc motor system that takes advantages of wide magnetic pitch FE PM pole modules, such as a 4H width module. The preferred embodiment consists of a DL FE magnet track stator 666a of a MAGYP described in FIGS. 12B-C, and an OEM COTS linear sliding forcer 662a-1, Model LMCF02C-HCO, consisting of ironless three phase current-carrying winding coils, made by H2WTech, 26380 Ferry Court, Santa Clarita, Calif. 91350. An arc shaped OEM sliding forcer 662a-2 with about 10% better force performance, which is a modification of Model LMCF02C-HCO, 662a-1, is also obtainable as a custom made device from H2WTech. A pair of symmetrical end pieces, which are made of low carbon or ferritic stainless steels and one of them is shown by 668a, is adapted to separate and retain the DL array. The preferred end pieces are well suited when the arc length of the motor has a short span, such as across several spatial periods of the PM track. The open arc bottom of stator 666a allows better ventilation for sliding coil forcer 662a-1 and 662a-2.

FIG. 14B illustrates another preferred embodiment of lightweight arc motor innovation that is preferred making use of FE PM pole modules with narrow magnetic pitches, such as that of 2H width modules. The embodiment consisting of a DL FE magnet track stator 666b of a MAGYP array, the back fixture of which is a lightweight refinement from that of a traditional U-shaped york, and a curved sliding forcer 662b-1, which consists of an innovative ironless three phase current-carrying Fine Geometry (FG) winding coils design as shown by 662b-2. This dedicated FG FE forcer comprises three phases of special fine oval-ring shaped winding coils arranged along a predetermined arc line of the FE PM motor device. The FG oval-shape winding coil consists of two straight, width-fixed sections that are fanned out from the arc center with a predetermined wedge angle. The wedge angle of the oval ring is designed to be ½ of the angle between two adjacent oral-ring coil symmetric center lines. The FG of the coil is such designed that all the magnetic forces on actuation current elements of coil are generated substantially perpendicular to the arc radius of the curvilinear motor, and hence, optimizing a high torque output and a low force ripple for the sliding forcer. A bottom air-gap retaining piece 668b (made by low carbon or ferritic stainless steels) is preferred especially when sectional extension for the arc motor stator is needed. The lightweight refinement of the stator fixture is achieved by machining array retaining back thinner or pocketed simply because MAGYP need less for magnet circuit return.

FIG. 14C illustrates a preferred embodiment of a slim lightweight FE PM linear motor system consisting of a DL linear motor stator 666c of MAGTP, which is retained in the push-on-trim-channel fixture structure described by 650 of FIG. 13D, and a linear sliding forcer 662c, which is a linear ironless three phase current-carrying winding coil set widely available from COTS OEM market. The preferred linear sliding forcer 662c is Model UM3S made by Tecnotion BV, Twentepoort West 15, 7609 RD, Almelo, The Netherlands. This sliding forcer is compatible to 2H width MAGTP/MAGYP model defined hereinbefore. This preferred embodiment has significantly lower size and weight than conventional DL PM linear motor retained in a steel based U-shaped york. In addition, the slim magnetic tracks 666c has a narrower width, which allows the sliding coil to be ventilated better since the upper and bottom parts of the motor 660c directly open to air. This embodiment is another example shows that the FE PM array architecture allows a lightweight, structurally simple, elegant format for linear/curvilinear motor devices with no or reduced use of ferromagnetic materials.

This invention has been disclosed in terms of preferred embodiments. It will be apparent that many modifications can be made to the disclosed method and apparatus without departing from the invention. Therefore, it is the intent of the appended claims to cover all such variations and modifications to come within the true spirit and scope of this invention.

What is claimed is:

1. A fine element (FE) magnet array configuration, comprising an arrangement of a set of predefined permanent magnet (PM) FEs;
   said predefined PM FEs set comprising two 3D shapes in a 45-45-90 triangular prism and a rectangular square prism that are symmetrically segmented geometries from a square prism reference;

said PM FE prisms being magnetized with a series of magnetization orientations each rotating in substantial 45° quantized steps from an edge reference within a front face of said FE prism;

said 45° quantized PM FE magnetizations generating eight (8) independent PM FEs, each having a distinctive FE pattern comprising a front face polygon of said FE prism with a magnetization vector inside;

said set of eight (8) independent PM FEs comprising finely-arrangeable FE patterns and characterized geometric and magnetic interfaces; wherein Said finely-arrangeable FE patterns allow variable width FE arrays to be finely mosaicked with spatially-seamless patterns while simultaneously allowing magnetizations of each PM FE array finely organized to optimize magnetic field augmentation;

Said characterized geometric and magnetic interfaces allow said PM FE array to be easily retained in static equilibrium with reduced retaining stress down to near zero; and said arrangement of a set of PM FEs comprising finely arranging said FEs into a series of PM FE arrays.

2. The FE magnet array configuration of claim 1, further comprising arranging a n-FE-composite ($FE_n$; n=2, 3, 4, . . . ) into PM FE array; wherein said $FE_n$ is a single piece extended building block comprising n adjacent PM FEs arranged into a predetermined $FE_n$ magnetization pattern that can be physically made as assembled or glued or magnetized; and said $FE_n$, including a type $FE_n$ that has a constant magnetization orientation, wherein said constant magnetization type $FE_n$ is equivalently made of either a $FE_n$ shaped single piece magnet or an assembled $FE_n$ because their resultant magnetizations and field distributions are essentially identical.

3. The FE magnet array configuration of claim 2 further comprises an $FE_2$ called Magnet Assemblies Grouped with Angled Polarities (MAGAP), wherein said MAGAP comprises two adjacent 45-45-90 triangular prism FEs in a square prism shape with 3 optional angled magnetization patterns including:

a MAGAP-90 comprising a special angled magnetization pattern with two magnetization vectors aligned along a 90° angled polyline reference that starts from said mid of an edge of said $1^{st}$ FE, pointing to and bending at said mid of said joint border line of two FEs, then rotated 90° pointing to said mid of said edge of said other FE;

a MAGAP-45EC comprising an angled magnetization pattern with two magnetization vectors aligned along a 45° angled polyline reference that starts from said mid of an edge of said first FE, pointing to and bending at said mid of said joint border of two FEs, then rotated 45° pointing to said right angle corner of said other FE;

a MAGAP-45CE comprising a special angled magnetization pattern with its two magnetization vectors aligned along a 45° angled polyline that starts from said right angle corner of said first FE, pointing to and bending at said mid of said joint border line of two FEs, then rotated 45° pointing to said mid of an edge of said other FE; and said MAGAPs being pre-assembled to said FE magnetization patterns that simplify next level PM FE array configuration and smooth field waveforms of said active field.

4. The FE magnet array configuration of claim 1, further comprising an arrangement of a group of selected PM FEs into said one-sided-operating pole modules; wherein said one-sided-operating pole modules comprise South pole and North pole modules each with a symmetrically configured FE mosaic pattern that arranges FE magnetization orientations that augments the magnetic field on said operating side of said FE PM pole module while diminishing said field on said back of said operating side;

said one-sided-operating North and South pole modules comprise arranging 5 segments of FE patterns $[E_l]$, $[M_l]$,$[C]$, $[M_r]$, $[E_r]$ into one of a group consisting of symmetrically sandwiched magnetization patterns structured and symbolized as:

$\{[E_l], [M_l], [C], [M_r], [E_r]\}$, $\{[M_l], [C], [M_r]\}$, $\{[E_l], [C], [E_r]\}$, and $\{[M_l], [M_r]\}$, and said arrangement of said North and South pole module comprises orienting a bundle of magnetization vectors into a predetermined pointing pattern, wherein:

for said North pole module, said orientations of said center, mid, and edge magnetization vectors are organized as all pointing convergently toward said referencing active North pole center;

for said South pole module, said orientations of said bundle of center, mid, and edge magnetization vectors are organized all pointing divergently apart from said referencing active South pole center;

said referencing active North pole center is a reference point located at said midpoint of said active North Pole surface of said center magnet of said North pole module; and said active South pole center is a reference point located at said midpoint of said active South Pole surface of said center magnet of said South pole module.

5. The FE magnet array configuration of claim 4, further comprising an arrangement of a FE pole module called Magnet Assembly Grouped with T-shaped Polarity (MAGTP), wherein:

said MAGTP is modularized as a cuboidal shaped black box type magnetic pole module;

said volume of said MAGTP array normal magnetized segment substantially equals to said volume of said entire array tangential magnetization segments;

said plurality of periodically paired alternating MAGTP South/North pole modules makes a MAGTP array;

said MAGTP array augments one-sided magnetic field on said active side of said FE PM array while diminishing the field on the other side to near zero;

said MAGTP array being easy to assemble as said MAGTP South/North pole modules magnetically attract each other on their sides;

said MAGTP array not having to use a soft ferromagnetic back providing a lightweight design, wherein said MAGTP array can be more flexibly retained in high-strength, and lightweight structures using metal alloy, carbon fiber, and polycarbonate materials; and said MAGTP array has periodic gaps between adjacent MAGTP modules filled with air or structural materials.

6. The FE magnet array configurations of claim 5, further comprising arrangements of Type-I MAGTPs by assigning:

said square prism $FE_2$ as said array-normal magnetized center magnet [C];

a pair of said rectangle prism FEs as said array-tangential magnetized edge magnets $\{[E_l],[E_r]\}$; and a pair of said adaptive width FE/FE$_n$ or nil as said wedge magnetized mid segments {[M$_l$],[M$_r$]} to form different modules including:
2H width Type-I MAGTP South and North modules having no said mid segment; and
4H width Type-I MAGTP South and North having a pair of said square prism shaped FE$_2$ magnet for a pair of mid magnet segments {[M$_l$],[M$_r$]}.

7. The FE magnet array configurations of claim 5, further comprising special arrangements of Type-II MAGTP modules by assigning:
said square prism FE$_2$ magnet as said array-normal magnetized center magnet [C];
said MAGAP-45EC and MAGAP-45CE assemblies as said combination of said array tangential magnetized edge magnets and outer part of said wedge magnetized mid magnets in said arrangement of {[E$_l$],[M$_l$–, –M$_r$], [E$_r$]}; and
said adaptively width FE/FE$_n$ or nothing as a pair of said inner part of said wedge magnetized mid magnet segments in format of {–M$_l$],[M$_r$–} to form different width Type-II modules, including preferred:
3H width Type-II MAGTP South and North modules comprising none of said additional inner part of said mid segment;
4H width Type-II MAGTP South and North comprising a pair of said special rectangle FE magnets as two inner parts of said wedge magnetized mid segments {–Ml$_l$], [M$_r$–]}; and
5H width Type-II MAGTP South and North comprising a pair of square prism shaped FE$_2$ magnets as 2 inner sandwiched wedge magnetized mid segments {–M$_l$], [M$_r$–]},
hereinbefore {[E$_l$], [M$_l$], [C], [M$_r$], [E$_r$]}=[E$_l$], {[M$_l$–+–M$_l$],[C], [M$_r$–+–M$_r$], [E$_r$]}.

8. The FE magnet array configurations of claim 5, further comprising special arrangements of Type-III MAGTP modules by assigning:
said 45-45-90 triangle prism shaped FE$_2$ magnet with its hypotenuse face orientated toward said active side of said MAGTP as array-normal magnetized center magnet [C];
a pair of special 45-45-90 triangle prism FE magnets with their hypotenuse faces orientated parallel to a pair of said leg faces of said 45-45-90 triangle prism shaped center magnet as a pair of said array tangential magnetized edge magnets {[E$_1$], [E$_r$] }; and
a pair of various width FE/FE$_n$ magnet(s) or nothing as said wedge magnetized mid segments {[Ml$_l$],[M$_r$]} to form various width modules, including preferred:
2H width Type-III MAGTP South and North comprising none of said mid segment;
4H width Type-III MAGTP South and North comprising a pair of parallelogram front face shaped FE$_2$ mosaiced by two adjacent special 45-45-90 triangle prism FE magnets as a pair of wedge magnetized mid magnet segments {[M$_l$],[M$_r$]}; and
5H width Type-III MAGTP South and North comprising a pair of parallelogram front face shaped FE$_3$, each consisting of a rectangle shaped FE sandwiched by 2 special 45-45-90 triangle prism FEs, as said wedge magnetized mid magnet segments {[M$_l$], [M$_r$]}.

9. The FE magnet array configurations of claim 5, further comprising special arrangements of Type-VI MAGTP modules by assigning:
said 2H width 45-45-90 triangle prism shaped FE$_2$ magnet with its hypotenuse faces orientated toward said none-active back side of said MAGTP as said array-normal magnetized center magnet [C];
a pair of said special 45-45-90 triangle prism FEs or a pair of said special rectangular FEs as said array tangential magnetized edge segments {[E$_l$], [E$_r$]}; and
various width and shape FE/FE$_n$ as an optional pair of said wedge magnetized mid segments {[M$_l$],[M$_r$]} to form various width modules, including preferred:
4H width Type-IV MAGTP South and North comprising a pair of said special 45-45-90 triangle prism FE$_2$ magnets with its hypotenuse faces orientated toward said active side of said MAGTP as a pair of mid magnetized segments;
and a pair of said special 45-45-90 triangle prism FEs with their one of leg faces orientated parallel to said array normal as a pair of edge magnet segments; and
5H width Type-IV MAGTP South and North comprising a pair of trapezoid shaped FE$_3$ mid magnetized segments, each consisting of said special 45-45-90 triangle prism FE magnet and one of said square prism FE$_2$ magnet as said wedge magnetized mid segments; and a pair of said special rectangular FE magnets as a pair of said array tangential magnetized edge segments.

10. The FE magnet array configurations of claim 5, further comprising special arrangements of Type-V MAGTP modules by assigning a sole symmetrical pair of various width FE/FE$_n$ magnet(s) in a rectangular outer shape to a pair of wedge magnetized mid segments {[M$_l$], [M$_r$]} without using said center and edge segments, including preferred:
1H width Type-V MAGTP South and North each consisting of a pair of said rectangular prism shaped FE magnets that are wedge magnetized as {[M$_l$], [M$_r$]}; and
2H width Type-V MAGTP South and North each having a pair of said square prism shaped FE$_2$ magnets that are wedge magnetized as {[M$_l$], [M$_r$]}.

11. The FE magnet array configuration of claim 4 further comprising: an arrangement of a FE pole module called a Magnet Assembly Grouped with Y-characteristic Polarity (MAGYP); said MAGYP being modularized as either a trapezoid or rectangular prism shaped, black box type FE pole module;
said MAGYP comprises a main pole in said front to provide active field and two linkage poles on two side faces along with a back pole to provide said side flux linking and back flux returning respectively;
said a plurality of periodically paired alternating MAGYP South/North pole modules make a MAGYP array;
said magnetization pattern of said MAGYP array augments said active magnet field in said front operating side;
said MAGYP array allows periodic gaps between adjacent MAGYP modules filled with air or PM or structural materials;
said MAGYP array being easy to assemble as said MAGYP South/North pole modules magnetically attract each other on their sides; and
said MAGYP being sectional and having a length extendable for constructing flexibly shaped linear/curvilinear FE PM arrays.

12. The FE magnet array configurations of claim 11, further comprising arrangements of Type-I MAGYP modules into said three segment sandwiched magnetizations {[M$_l$],[C], [M$_r$]}, wherein said special array-normal magnetized center magnet [C] is assigned as said square prism FE$_2$ magnet (or its isosceles trapezoid prism shaped equivalent); and a pair of said wedge magnetized magnet segments {[M_l], [M_r]} are a symmetrical pair of various width said FE/FE_n magnet(s) in a rectangular prism outer shape with various width, including preferred:
- 3H width Type-I MAGYP South and North, wherein a pair of said square prism FE_2 shaped wedge magnetized magnet are selected for said wedge segments {[M_l], [M_r]}; and
- 4H width Type-I MAGYP South and North, wherein a pair of said rectangular prism outer shaped FE_3 and wedge magnetized magnet segments, each consisting of a square prism FE_2 and an adjacent FE, are selected for said wedge segments {[M_l], [M_r]}.

13. The FE magnet array configurations of claim 11, further comprising special arrangements of Type-II MAGYP modules by assigning: said FE_4 cuboidal format magnet (or its isosceles trapezoidal prism shaped equivalent) as array normal magnetized center segment [C], said MAGAP-45EC and MAGAP-45CE assemblies as a pair of said combination of said outer part of wedge and said array tangential magnetized segments denoted as {[E_l],[M_l-; -M_r], [E_r]}); and said adaptively width FE/FE_n or nothing as a pair of said inner part of said mid wedge magnetized segments {-M_l], [M_r-} to form a series of different width modules, including preferred:
- 4H width Type II MAGYP South and North comprising none of said additional inner part of said mid magnet segments;
- 5H width Type II MAGYP South and North comprising a pair of said special rectangle FE magnets as two inner mid wedge magnetized magnet segments {-M_l], [M_r-]}; and
- 6H width Type II MAGYP South and North comprising a pair of said square prism FE_2 magnets as two inner sandwiched mid wedge magnetized magnet segments {-M_l], [M_r-]}, Hereinbefore, [M_l-+-M_l]=[M_l]; and [M_r-+-M_r]=[M_r].

14. The FE magnet array configurations of claim 11, further comprising special arrangements of Type-III MAGYP modules into said three segments of said sandwiched magnetization structure {[M_l],[C], [M_r]} by assigning a symmetrical pair of FE_2 shaped wedge magnetized magnets for {[M_l],[M_r]} parts that sandwich a 2H width specially magnetized FE_4 (or its isosceles trapezoid prism shaped equivalent) in the center, including preferred modules of:
- 4H width Type-III_a MAGYP South and North, utilizing said rectangular prism FE_4 (or its isosceles trapezoid prism shaped equivalent) as normal magnetized [C] segment; and
- 4H width Type-III_b MAGYP South and North, each consisting of a 45-45-90 triangular prism FE_2 magnet (with its hypotenuse faces orientated toward said active field side) as said array normal magnetized center magnet [C] sandwiched by a pair of said FE_3 magnets as a pair of wedge magnetized segments.

15. The FE magnet array configurations of claim 11, further comprising arrangements of Type-IV MAGYP modules by assigning: said isosceles trapezoid prism shaped FE_4 magnet as said array normal magnetized center magnet piece [C] with its short parallel edge arranged as said active side; a pair of said FE magnets as a pair of said array tangential magnetized edge magnet segments {[El_l],[E_r]}; a pair of said FE_n magnets as a pair of said wedge magnetized mid magnet segments {[M_l], [M_r]} for various width modules, including said preferred modules of:
- 5H width Type-IV MAGYP South and North, each comprising a symmetrical pair of said 45-45-90 FE_2 magnet as said wedge magnetized mid segments; and a symmetrical pair of said special 45-45-90 triangle prism FEs as said tangential magnetized edge segments; and
- 6H width Type-IV MAGYP South and North modules each comprising a symmetrical pair of FE_3 magnets each comprising a square prism FE_2 magnet and a 45-45-90 FE as said wedge magnetized mid segments; and a symmetrical pair of said rectangular prism FE magnets as said array tangential magnetized edge magnets.

16. A FE PM servomotor assembly, comprising:
An FE PM array track assembly comprising a plurality of South/North alternating MAGTP or MAGTP pole modules retained in a linear or curvilinear format to provide an alternating magnetic field in said active front of said FE PM track;
an FE PM array matching three-phase current-carrying coil forcer guided by a bearing device to be sliding along said active front of said linear or curvilinear FE magnetic track wherein said curvilinear FE magnetic track is matched by an FG FE arc motor coil embodiment, consisting of three phases of said finely shaped and finely arranged oval-ring winding coils sliding along a predetermined arc track line of said curvilinear FE PM magnetic track device; and
an OEM servomotor drive sub-system with an integrated OEM encoder energizing said coil forcer in said closed loop controlled mode to operate said coil forcer and a secured payload along said linear or curvilinear FE PM track.

17. The FE PM servomotor assembly of claim 16 wherein said FE PM track assembly comprises a lightweight material fixture for retaining an FE MAGTP or MAGYP pole module array, said retaining fixture comprises:
a pair of upper and lower U-shape structured push-on-trim-channels each made of non-magnetic lightweight high-strength structural materials including carbon fiber, aluminum alloy, polycarbonate, and non-magnetic stainless steel materials;
a thin layer of soft ferromagnetic back sheet inserted into said U-shaped structural channels and retained on non-operating side of said FE pole module array; and
periodic inter pole module spacers being made of ferromagnetic or non-ferromagnetic materials;
said various number of FE alternating pole modules separated by said inter module spacers being pushed into a pair of said U-shape structured channels, on to said periodic retaining positions with a soft ferromagnetic sheet on said array back for constructing a low cost FE magnetic track assembly.

18. The FE PM servomotor assembly of claim 16, wherein said magnetic track assembly further comprises a DL fixture that retained FE MAGTP or MAGYP array magnetic track, wherein
said operating sides of said dual layers of FE arrays facing each other to form an air-gap;
each upper and lower part of said dual layers comprises a plurality of said alternating FE MAGTP or MAGYP pole modules arranged as each center of said South poles on said lower layer is aligned substantially underneath each center of said North poles on said upper layer so that said active magnetic fields between said dual layers are constructively superimposed within said air-gap; and
said magnetic track dual layer assembly further comprises a pair of soft ferromagnetic end pieces that redirect said magnetic field of said linkage ports of MAGTP or MAGYP at two ends of said track assembly for enhancing said FE magnet array performance and mechanically retaining said dual layers with a fixed air-gap.

19. The DL FE MAGYP array magnetic track of claim 18, further comprising a preferred arc shaped FE PM magnetic track assembly that retains periodic isosceles trapezoid prism shaped 4H width Type-II MAGYP South and North modules, wherein said optional inter-module spacers are tangential magnetized PMs with each of their magnetization vectors arranged pointing from its adjacent MAGYP South module to an adjacent MAGYP North module.

20. The FE PM magnetic track assembly of claim 19 wherein said center magnets of said 4H width Type-II MAGYP are isosceles trapezoid prism shaped with a 12° wedge angle, said unit width (1H) of MAGYP is 0.25 inches, said magnet pitch is twenty-four degrees (24°), and said arc shaped array retaining fixture of said MAGYP motor assembly has a predetermined outer radius approximately 6.29 inches (160 mm) or 7.1 inches (180 mm).

21. The FE PM servomotor assembly of claim 16, wherein said FG FE arc motor coil forcer, is an interacting part to an arc shaped FE PM magnetic track assembly, comprising three fine oval-ring shaped winding coils, each comprising two straight, fixed-width-sections that are fanned out from the arc center with a predetermined wedge angle; wherein said wedge angle of two straight sections of said oval ring is of said angle between said two symmetric center lines of two adjacent oral-ring coils.

\* \* \* \* \*